United States Patent
Nagasawa

(10) Patent No.: US 11,861,547 B2
(45) Date of Patent: Jan. 2, 2024

(54) DELIVERY MANAGEMENT SYSTEM, DELIVERY MANAGEMENT METHOD, AND PROGRAM

(71) Applicant: MEDIPAL HOLDINGS CORPORATION, Tokyo (JP)

(72) Inventor: Kazunori Nagasawa, Tokyo (JP)

(73) Assignee: MEDIPAL HOLDINGS CORPORATION, Tokyo (JP)

( * ) Notice: Subject to any disclaimer, the term of this patent is extended or adjusted under 35 U.S.C. 154(b) by 554 days.

(21) Appl. No.: 17/254,834

(22) PCT Filed: Jun. 26, 2018

(86) PCT No.: PCT/JP2018/024155
§ 371 (c)(1),
(2) Date: Dec. 21, 2020

(87) PCT Pub. No.: WO2020/003371
PCT Pub. Date: Jan. 2, 2020

(65) Prior Publication Data
US 2021/0264354 A1    Aug. 26, 2021

(51) Int. Cl.
*G06Q 10/0832* (2023.01)
*G06Q 10/0833* (2023.01)
(Continued)

(52) U.S. Cl.
CPC .......... *G06Q 10/0832* (2013.01); *B60P 3/007* (2013.01); *B60P 3/20* (2013.01); *G06Q 10/087* (2013.01); *G06Q 10/0833* (2013.01)

(58) Field of Classification Search
CPC .......... G06Q 10/0832; G06Q 10/0833; G06Q 10/087; G06Q 50/28; G06Q 10/08; B60P 3/007; B60P 3/20
See application file for complete search history.

(56) References Cited

U.S. PATENT DOCUMENTS

2003/0233189 A1   12/2003   Hsiao et al.
2008/0255758 A1*  10/2008   Graham ............. G06Q 10/0833
                                                       701/469
(Continued)

FOREIGN PATENT DOCUMENTS

JP    2005284341 A    10/2005
JP    2006-515696 A    6/2006
(Continued)

OTHER PUBLICATIONS

Extended European Search Report issued in EP 18924916.2 dated Dec. 2, 2021 (14 pages).

(Continued)

*Primary Examiner* — Ziaul Karim
(74) *Attorney, Agent, or Firm* — MASUVALLEY & PARTNERS; Peter Martinez

(57) ABSTRACT

An object of the present invention is to provide an environment history acquired from the environment in a container during transport of an article, ascertain a transport status including a transport route and the like of the article, and execute quality control of the article in real time. An article management server 9 memorizes location data and a device code received from a GPS receiver 37 in a second memory unit in association with each other, memorizes temperature data received from a delivery unit 17 regularly and/or irregularly in a third memory unit associated with a unit number respectively, and memorizes a unit number and a serial number of an article in a fourth memory unit in association with each other. A transport-status-data generation unit 9a uses a set of a certain unit number and a device code as a key, to generate transport status data representing a serial number, location data, and temperature data of the article during transport, based on the location data acquired from the second memory unit corresponding to the device code, the temperature data acquired from the third memory (Continued)

unit corresponding to the unit number, and the serial number acquired from the fourth memory unit corresponding to the unit number.

17 Claims, 24 Drawing Sheets

(51) Int. Cl.
    *G06Q 10/087*     (2023.01)
    *B60P 3/00*     (2006.01)
    *B60P 3/20*     (2006.01)

(56) References Cited

U.S. PATENT DOCUMENTS

| | | | | |
|---|---|---|---|---|
| 2008/0261636 | A1* | 10/2008 | Lau | G16H 50/20 455/466 |
| 2011/0173023 | A1* | 7/2011 | LeClair | G06Q 50/30 435/284.1 |
| 2015/0156747 | A1* | 6/2015 | Skaaksrud | H04L 67/01 455/456.1 |
| 2015/0347959 | A1* | 12/2015 | Skaaksrud | H04W 28/0231 705/333 |
| 2016/0050909 | A1* | 2/2016 | Deckelbaum | A61K 31/202 435/1.2 |
| 2018/0144298 | A1 | 5/2018 | Rankin | |

FOREIGN PATENT DOCUMENTS

| | | |
|---|---|---|
| JP | 2015013704 A | 1/2015 |
| JP | 2017186035 A | 10/2017 |
| JP | 2018092434 A | 6/2018 |
| JP | 2018063516 A | 5/2020 |

OTHER PUBLICATIONS

WIPO, Japan International Search Authority, International Search Report (with English translation) and Written Opinion dated Sep. 18, 2018 in International Patent Application No. PCT/JP2018/024155, 8 pages.

* cited by examiner

| | DEVICE CODE | UNIT NUMBER | USED FLAG | UPDATE DATE | |
|---|---|---|---|---|---|
| 1 | 1 | 222222 | 1 | 2018/02/20 18:20:45 | Gps0001 |
| 2 | 2 | 111111 | 1 | 2018/02/20 18:20:45 | Gps0002 |

| ARTICLE NAME | PRODUCT A ▼ |
|---|---|
| LOT | ~ |
| SERIAL | ~ |
| DATE | 2017/11/01 ~ [SEARCH] |

REFINE SEARCH (2)

| DATE | LOT No. | EXPIRATION DATE | SERIAL NUMBER | CURRENT LOCATION | STATUS |
|---|---|---|---|---|---|
| 2017/11/09 | LOT17100B | 2019/01 | SN10303B | KANAGAWA ALC | DISPATCHING |
| 2017/11/09 | LOT17100B | 2019/01 | SN10304B | KANAGAWA ALC | DISPATCHING |
| 2017/11/09 | LOT17100C | 2020/05 | SN103014C | KANAGAWA ALC | DISPATCHING |
| 2017/11/09 | LOT17100C | 2020/05 | SN10305C | KANAGAWA ALC | DISPATCHING |
| 2017/11/09 | LOT17100C | 2020/05 | SN10306C | KANAGAWA ALC | DISPATCHING |
| 2017/11/09 | LOT17100D | 2020/10 | SN10307D | KANAGAWA ALC | DISPATCHING |
| 2017/11/09 | LOT17100A | 2020/01 | SN103010A | KANAGAWA ALC | SHIFT BETWEEN SHIPPERS |
| 2017/11/07 | SE17005A | 2022/02 | SE17005A26 | TEST HOSPITAL A | ADMINISTRATION |

| ARTICLE NAME | PRODUCT A | LOT No. | SE17005A | TIME DEADLINE | 2022/02 | SERIAL NUMBER | SE17005A26 |
|---|---|---|---|---|---|---|---|
| NUMBER OF PICKUPS | 1 | CURRENT TEMPERATURE | −194.4°C | [CONFIRM TEMPERATURE HISTORY] | [OUTPUT SERIAL TEMPERATURE DATA] | [CONFIRM LOCATION INFORMATION] | |

(2)

| UPDATE DATE AND TIME | STATUS | UNIT NUMBER | CURRENT LOCATION | FREIGHT MOVEMENT SOURCE | FREIGHT MOVEMENT DESTINATION |
|---|---|---|---|---|---|
| 2017/10/10 15:47:25 | SHIPMENT FROM MANUFACTURER | 500101 | TEST MANUFACTURER (CO., LTD.) | TEST MANUFACTURER (CO., LTD.) | MINANI OSAKA ALC |
| 2017/10/11 13:50:29 | DELIVERY FROM MANUFACTURER | 500101 | TEST MANUFACTURER (CO., LTD.) | TEST MANUFACTURER (CO., LTD.) | MINANI OSAKA ALC |
| 2017/10/11 15:16:06 | ARRIVAL AT DESTINATION | 500101 | NISHI NIHON LOGISTICS C | TEST MANUFACTURER (CO., LTD.) | MINANI OSAKA ALC |
| 2017/10/12 11:22:52 | DELIVERY FROM VIA DESTINATION | 500101 | NISHI NIHON LOGISTICS C | TEST MANUFACTURER (CO., LTD.) | MINANI OSAKA ALC |
| 2017/10/12 13:12:44 | ARRIVAL AT WAREHOUSE | 500101 | MINANI OSAKA ALC | TEST MANUFACTURER (CO., LTD.) | MINANI OSAKA ALC |
| 2017/10/12 13:35:39 | WAREHOUSING | 500101 | MINANI OSAKA ALC | TEST MANUFACTURER (CO., LTD.) | MINANI OSAKA ALC |
| 2017/11/06 09:45:41 | DISPATCHING | 500101 | MINANI OSAKA ALC | MINANI OSAKA ALC | TEST HOSPITAL A |
| 2017/11/06 13:35:11 | DELIVERY BETWEEN WAREHOUSES | 500101 | MINANI OSAKA ALC | MINANI OSAKA ALC | |
| 2017/11/06 15:13:38 | ARRIVAL AT DESTINATION | 500101 | NISHI NIHON LOGISTICS C | MINANI OSAKA ALC | TEST HOSPITAL A |
| 2017/11/07 05:03:11 | DELIVERY FROM VIA DESTINATION | 500101 | NISHI NIHON LOGISTICS C | MINANI OSAKA ALC | TEST HOSPITAL A |
| 2017/11/07 06:29:33 | ARRIVAL AT DESTINATION | 500101 | AMAGASAKI | MINANI OSAKA ALC | TEST HOSPITAL A |
| 2017/11/07 10:49:11 | DELIVERY TO CLIENT | 500101 | AMAGASAKI | MINANI OSAKA ALC | TEST HOSPITAL A |
| 2017/11/07 10:49:21 | COMPLETION OF DELIVERY | 500101 | TEST HOSPITAL A | MINANI OSAKA ALC | TEST HOSPITAL A |
| 2017/11/07 14:14:09 | ADMINISTRATION | 500101 | TEST HOSPITAL A | MINANI OSAKA ALC | TEST HOSPITAL A |

FIG.22(a)

| | | | | | | |
|---|---|---|---|---|---|---|
| ARTICLE NAME | PRODUCT A ▼ | | | | | |
| LOT | | ~ | | | | (1) |
| SERIAL | | ~ | | | | |
| DATE | 2017/11/01 | ~ | | SEARCH | | |
| REFINE SEARCH | | | | | | |

| DATE | LOT No. | EXPIRATION DATE | SERIAL NUMBER | CURRENT LOCATION | STATUS | |
|---|---|---|---|---|---|---|
| 2017/12/05 | SN16022A | 2021/09 | SN16022A32 | NAGOYA ALC | RECOVERED FROM TEMPERATURE ABNORMALITY | |
| 2017/12/05 | SN16022A | 2021/09 | SN16022A35 | NAGOYA ALC | RECOVERED FROM TEMPERATURE ABNORMALITY | |
| 2017/12/05 | SN16022A | 2021/09 | SN16022A36 | NAGOYA ALC | RECOVERED FROM TEMPERATURE ABNORMALITY | |
| 2017/12/05 | SN16022A | 2021/09 | SN16022A37 | NAGOYA ALC | RECOVERED FROM TEMPERATURE ABNORMALITY | (2) |
| 2017/12/05 | SN16022A | 2021/09 | SN16022A39 | NAGOYA ALC | RECOVERED FROM TEMPERATURE ABNORMALITY | |
| 2017/12/05 | SN16022A | 2021/09 | SN16022A40 | NAGOYA ALC | RECOVERED FROM TEMPERATURE ABNORMALITY | |
| 2017/12/04 | SN17006A | 2022/02 | SN17006A08 | MINAMI OSAKA ALC | DISPATCHING | |
| 2017/12/04 | SN17009A | 2022/03 | SN17009A22 | MINAMI OSAKA ALC | DISPATCHING | |
| 2017/12/04 | SN17006A | 2022/03 | SN17009A67 | MINAMI OSAKA ALC | DISPATCHING | |
| 2017/12/04 | SN17009A | 2022/03 | SN17009A57 | MINAMI OSAKA ALC | DISPATCHING | |

FIG.22(b)

| ARTICLE NAME | PRODUCT A | LOT No. | SN16027A | TIME DEADLINE | 2021/10 | SERIAL NUMBER | SN16027A26 |
| NUMBER OF PICKUPS | 3 | CURRENT TEMPERATURE | 15.9°C | CONFIRM TEMPERATURE HISTORY | | OUTPUT SERIAL TEMPERATURE DATA | CONFIRM LOCATION INFORMATION |

| UPDATE DATE AND TIME | STATUS | UNIT NUMBER | CURRENT LOCATION | FREIGHT MOVEMENT SOURCE | FREIGHT MOVEMENT DESTINATION |
| --- | --- | --- | --- | --- | --- |
| 2017/05/17 14:58:23 | SHIPMENT FROM MANUFACTURER | 500063 | TEST MANUFACTURER (CO., LTD.) | TEST MANUFACTURER (CO., LTD.) | NAGOYA ALC |
| 2017/05/18 13:47:06 | DELIVERY FROM MANUFACTURER | 500063 | TEST MANUFACTURER (CO., LTD.) | TEST MANUFACTURER (CO., LTD.) | NAGOYA ALC |
| 2017/05/18 15:02:05 | ARRIVAL AT DESTINATION | 500063 | NISHI NIHON LOGISTICS C | TEST MANUFACTURER (CO., LTD.) | NAGOYA ALC |
| 2017/05/18 16:11:50 | DELIVERY FROM VIA DESTINATION | 500063 | NISHI NIHON LOGISTICS C | TEST MANUFACTURER (CO., LTD.) | NAGOYA ALC |
| 2017/05/18 21:05:14 | ARRIVAL AT WAREHOUSE | 500063 | NAGOYA ALC | TEST MANUFACTURER (CO., LTD.) | NAGOYA ALC |
| 2017/05/19 09:20:40 | WAREHOUSING | 500063 | NAGOYA ALC | TEST MANUFACTURER (CO., LTD.) | NAGOYA ALC |
| 2017/05/19 09:20:54 | ARRIVAL OF ARTICLES | 500063 | NAGOYA ALC | NAGOYA ALC | NAGOYA ALC |
| 2017/06/14 10:17:49 | DISPATCHING | 500063 | NAGOYA ALC | NAGOYA ALC | KANAGAWA ALC |
| 2017/06/14 11:19:11 | DELIVERY BETWEEN WAREHOUSES | 500063 | NAGOYA ALC | NAGOYA ALC | KANAGAWA ALC |
| 2017/06/14 20:17:04 | ARRIVAL AT DESTINATION | 500063 | TOKYO LOGISTICS C | NAGOYA ALC | KANAGAWA ALC |
| 2017/06/15 16:13:36 | DELIVERY FROM VIA DESTINATION | 500063 | TOKYO LOGISTICS C | NAGOYA ALC | KANAGAWA ALC |
| 2017/06/19 10:13:00 | WAREHOUSING | 500063 | KANAGAWA ALC | NAGOYA ALC | KANAGAWA ALC |
| 2017/06/20 15:59:54 | SHIFT BETWEEN SHIPPERS (SHIFT) | 500070 | KANAGAWA ALC | KANAGAWA ALC | KANAGAWA ALC |
| 2017/07/10 16:23:12 | SHIFT BETWEEN SHIPPERS (SHIPMENT) | 500019 | KANAGAWA ALC | KANAGAWA ALC | KANAGAWA ALC |
| 2017/07/10 16:23:57 | DISPATCHING | 500019 | KANAGAWA ALC | KANAGAWA ALC | TEST HOSPITAL B SUPPLIES DIVISION |
| 2017/07/10 19:58:02 | DELIVERY BETWEEN WAREHOUSES | 500019 | KANAGAWA ALC | KANAGAWA ALC | |
| 2017/07/10 22:08:08 | ARRIVAL AT DESTINATION | 500019 | TOKYO LOGISTICS C | KANAGAWA ALC | TEST HOSPITAL B SUPPLIES DIVISION |
| 2017/07/11 16:21:35 | DELIVERY FROM VIA DESTINATION | 500019 | TOKYO LOGISTICS C | KANAGAWA ALC | TEST HOSPITAL B SUPPLIES DIVISION |
| 2017/07/11 19:41:13 | ARRIVAL AT DESTINATION | 500019 | MINAMI TOKYO ALC | KANAGAWA ALC | TEST HOSPITAL B SUPPLIES DIVISION |
| 2017/07/12 12:11:36 | DELIVERY FROM VIA DESTINATION | 500019 | MINAMI TOKYO ALC | KANAGAWA ALC | TEST HOSPITAL B SUPPLIES DIVISION |
| 2017/07/12 12:11:55 | COMPLETION OF DELIVERY | 500019 | TEST HOSPITAL B SUPPLIES DIVISION | KANAGAWA ALC | TEST HOSPITAL B SUPPLIES DIVISION |
| 2017/07/14 10:34:23 | ADMINISTRATION | 500019 | TEST HOSPITAL B SUPPLIES DIVISION | KANAGAWA ALC | TEST HOSPITAL B SUPPLIES DIVISION |

DELIVERY MANAGEMENT SYSTEM, DELIVERY MANAGEMENT METHOD, AND PROGRAM

RELATED APPLICATIONS

This application is the U.S. National Phase of and claims priority to International Patent Application No. PCT/JP2018/024155, International Filing Date Jun. 26, 2018, entitled Delivery Management System, Delivery Management Method, And Program, which is incorporated herein by reference in its entirety.

FIELD

The present invention relates to a delivery management system, a delivery management method, and a program.

BACKGROUND

Conventionally, in a process of accommodating articles such as pharmaceutical products or foods and delivering the articles, a sensor information management system in which an environment status such as the temperature and the humidity in a container that accommodates therein the articles during delivery is measured automatically by a sensor, and an environment history represented by a measured value is transmitted together with the articles has been known.

As an example of such a conventional sensor information management system, Patent Literature 1 has been known.

In Patent Literature 1, in order to provide an environment history acquired from the environment during transport or storage of articles, such a technique has been disclosed that a wireless tag that transmits a unique tag number is added to an article, and a package that stores the article therein includes a first node connected to a sensor that measures a physical quantity of the environment and a second node that receives information transmitted from the first node, thereby enabling to transmit and receive the tag number and a measurement value transmitted from the first node.

More specifically, the first node includes a tag number reader that requests transmission of a tag number to the wireless tag and receives the tag number, a measurement value reader that reads a value measured by a sensor, and a transmission unit that transmits the tag number and the measurement value. The second node includes a reception unit that receives the tag number and the measurement value transmitted by the transmission unit, an information storage unit that stores therein information received by the reception unit, and a node-information transmission and reception unit that transmits and receives information stored in the information storage unit. The technique has an advantage such that quality control can be executed reliably by providing the environment history during transport or storage of the articles.

According to Patent Literature 1, there are such effects that articles are sorted during distribution, and even if the articles are reloaded, the history of the environment having passed through in each stage of a distribution route can be easily ascertained for an individual article, thereby enabling to control the quality reliably.

CITATION LIST

Patent Literature

Patent Literature 1: Japanese Patent Application Laid-open No. 2005-284341

SUMMARY

Technical Problem

However, in Patent Literature 1, since the main object is to provide an environment history acquired from the environment during transport or storage of articles, quality control of the articles cannot be executed in real time.

For example, stock control of pharmaceutical products handled by medical institutions or the like requires, from the nature of the article, not only high expertness and knowledge with regard to handling thereof, but also storage in a special container and careful delivery according to the pharmaceutical product. Therefore, there has been a desire to execute quality control of articles in real time.

Therefore, it has been desired to develop a delivery management system that not only can provide an environment history acquired from the environment in a container during transport of articles, but also can manage the transport status of articles.

The present invention has been achieved in view of the above requirements, and an object of the present invention is to provide an environment history acquired from the environment of a container during transport of articles, ascertain the transport status including a transport route of the articles and the like, and execute quality control of the articles in real time.

Solution to Problem

In order to solve the above problems, the invention according to claim 1 is a delivery management system comprising a delivery unit for delivering a container in which an accommodated article is cooled by a refrigerant, and an article management server that communicates with the delivery unit during transport via a communication network, wherein the delivery unit includes a GPS receiver that receives each GPS signal from a plurality of GPS satellites to calculate location data based on each of the GPS signals, adds a unique device code to the location data, and transmits the location data to the article management server, a temperature measurement unit that measures a temperature in the container, a first memory unit that memorizes therein temperature data measured by the temperature measurement unit in a time series, and a first transmission unit that adds a unit number of the delivery unit to temperature data acquired from the first memory unit and transmits the temperature data regularly and/or irregularly to the article management server via the communication network, and the article management server includes a second memory unit that memorizes therein the location data and the device code received from the GPS receiver in association with each other, a third memory unit that memorizes therein the temperature data received from the delivery unit regularly and/or irregularly associated with each unit number, a fourth memory unit that memorizes therein the unit number and a serial number of the article in association with each other, and a transport-status-data generation unit that generates transport status data representing a serial number, location data, and temperature data of the article during transport based on location data acquired from the second memory unit corresponding to the device code, temperature data acquired from the third memory unit corresponding to the unit number, and serial number acquired from the fourth memory unit corresponding to the unit number, by using a set of a certain unit number and a device code as a key.

Advantageous Effects of Invention

According to the present invention, it is possible to provide an environment history acquired from the environment of a container during transport of articles, ascertain the transport status including a transport route of the articles and the like, and execute quality control of the articles in real time.

BRIEF DESCRIPTION OF DRAWINGS

FIGS. 20(a) and (b) are screen transition diagrams of temperature history information, being an example of transport status data according to one embodiment of the present invention.

FIGS. 22(a) and (b) are screen transition diagrams of location information, being an example of transport status data according to one embodiment of the present invention.

DESCRIPTION OF EMBODIMENTS

Figure 1:
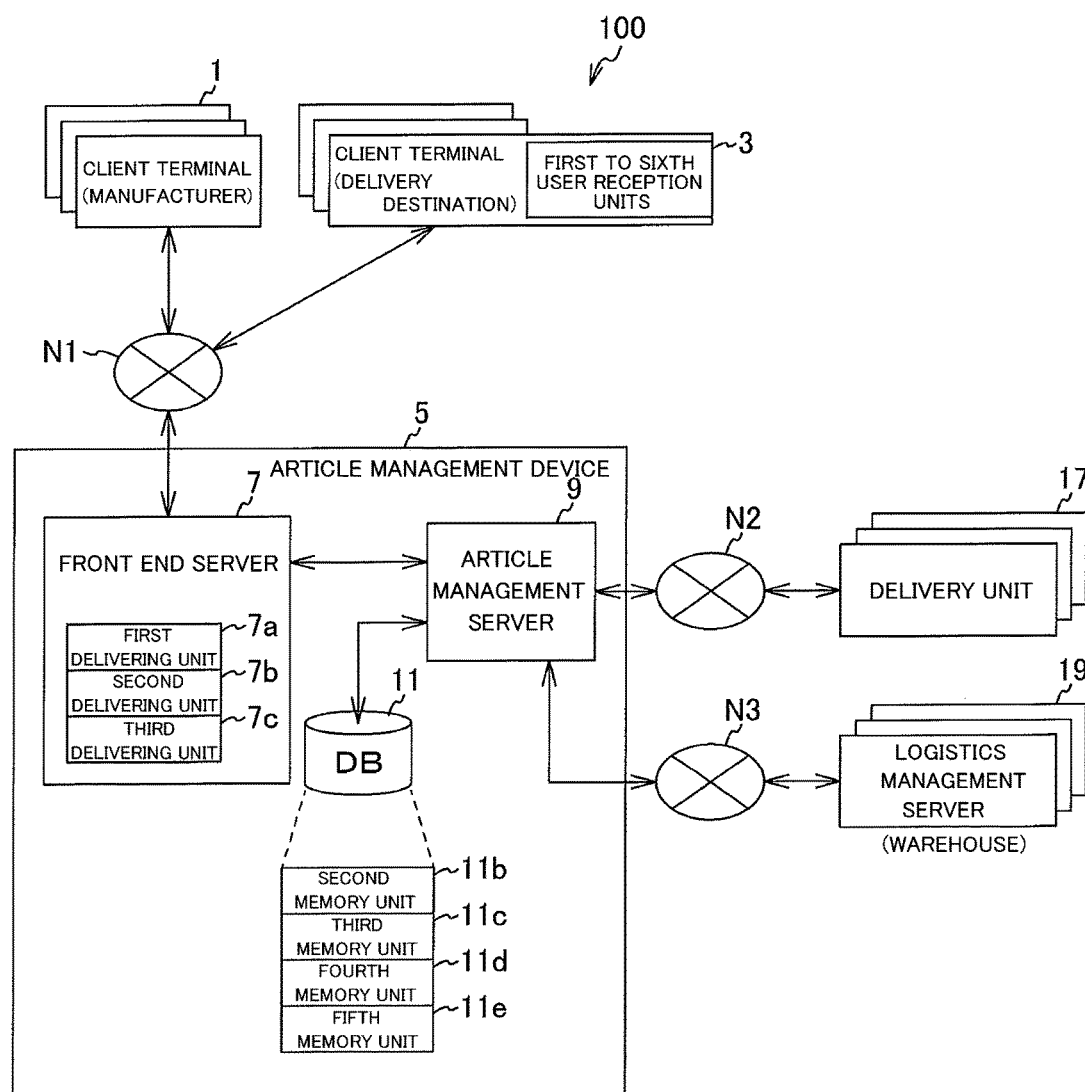
FIG. 1 is a block diagram illustrating a configuration of a delivery management system according to one embodiment of the present invention.

The present invention is described below in detail based on embodiments illustrated in the drawings.

The present invention has a configuration described below, in order to provide an environment history acquired from the environment in a container during transport of articles, and execute quality control of the articles in real time by ascertaining the transport status including a transport route of the articles and the like.

That is, a delivery management system according to the present invention comprises a delivery unit for delivering a container in which an accommodated article is cooled by a refrigerant, and an article management server that communicates with the delivery unit during transport via a communication network, wherein the delivery unit includes a GPS receiver that receives each GPS signal from a plurality of GPS satellites to calculate location data based on each of the GPS signals, adds a unique device code to the location data, and transmits the location data to the article management server, a temperature measurement unit that measures a temperature in the container, a first memory unit that memorizes therein the temperature data measured by the temperature measurement unit in a time series, and a first transmission unit that adds a unit number of the delivery unit to temperature data acquired from the first memory unit and transmits the temperature data regularly and/or irregularly to the article management server via the communication network, and the article management server includes a second memory unit that memorizes therein the location data and the device code received from the GPS receiver in association with each other, a third memory unit that memorizes therein the temperature data received from the delivery unit regularly and/or irregularly associated with each unit number, a fourth memory unit that memorizes therein the unit number and a serial number of the article in association with each other, and a transport-status-data generation unit that generates transport status data representing a serial number, location data, and temperature data of the article during transport based on location data acquired from the second memory unit corresponding to the device code, temperature data acquired from the third memory unit corresponding to the unit number, and serial number acquired from the fourth memory unit corresponding to the unit number, by using a set of a certain unit number and a device code as a key.

By having the above configuration, the environment history acquired from the environment in the container during transport of the articles can be provided, and the transport status including a transport route of the articles and the like can be ascertained, thereby enabling to execute quality control of the articles in real time.

Characteristics of the present invention described above are explained in detail with reference to the drawings mentioned below. Note that, unless otherwise specified, constituent elements, types, combinations, shapes, and relative arrangements thereof described in the following embodiments are not intended to limit the scope of the present invention solely thereto and are only explanatory examples.

Characteristics of the present invention described above are explained below in detail with reference to the drawings.

<Delivery Management System>

FIG. 1 is a block diagram illustrating a configuration of a delivery management system according to one embodiment of the present invention.

In the following descriptions, like constituent elements are denoted by like reference signs and explained.

A delivery management system 100 is configured to include a client terminal (manufacturer) 1, a client terminal (delivery destination) 3, communication networks N1, N2, and N3, an article management device 5, a delivery unit 17, and a logistics management server 19.

The article management device 5 is configured to include a front end server 7, an article management server 9, and a database (hereinafter, DB) 11.

In the present embodiment, the client terminal (manufacturer) 1, the client terminal (delivery destination) 3, the delivery unit 17, and the logistics management server 19 are configured by a plurality of units. However, these units may be configured by one unit. Further, the communication network is divided into N1, N2, and N3. However, these networks may be configured by the same network.

The front end server 7 has a function of receiving data from the client terminal (manufacturer) 1 and the client terminal (delivery destination) 3 via the network N1, to manage a direct access service to the client terminal (manufacturer) 1 and the client terminal (delivery destination) 3 and change of a display format, and includes a first delivering unit 7a to a third delivering unit 7c that perform delivery to each terminal.

The first delivering unit 7a delivers input screen data generated by a first input-screen-data generation unit 9c to a user terminal 3. The second delivering unit 7b delivers input screen data generated by a second input-screen-data generation unit 9e to the user terminal 3. The third delivering unit 7c delivers temperature status data generated by a temperature-status-data generation unit 9f to the user terminal 3 (see FIG. 1).

The client terminal (manufacturer) 1 is a terminal operable by a manufacturer and the client terminal (delivery destination) 3 is a terminal operable by a delivery destination, and each includes first to sixth user reception units.

The article management server 9 receives data of the delivery unit 17 via the communication network N2 to manage the state of each delivery unit 17.

The article management server 9 includes therein a ROM (Read Only Memory), a RAM (Random Access Memory), a CPU (Central Processing Unit), and an HDD (Hard Disk Drive), reads an operating system OS from the HDD and expands the OS on the RAM to activate the OS, and reads programs (programs indicated by various flowcharts described later) from the HDD to perform various processes under control of the OS.

The database (DB) 11 is connected to the article management server 9 and includes second memory unit 11b to fifth memory unit 11e.

The second memory unit 11b memorizes location data received from a GPS receiver 37 in a GPS information file F1 in association with a device code unique to the GPS receiver 37.

The third memory unit 11c memorizes temperature data received from the delivery unit 17 regularly and/or irregularly in a temperature history file F5 in association with each unit number of the delivery unit 17.

The fourth memory unit 11d memorizes a unit number of the delivery unit 17 in a trace file F7 in association with a serial number of an article.

The fifth memory unit 11e memorizes transport status data generated by a transport-status-data generation unit 9a. Here, the transport status data represents a serial number, location data, and temperature data of an article during transport. More specifically, the transport-status-data generation unit 9a creates a serial temperature history file F9 regarding the temperature data by using the temperature history file F5 and the trace file F7 and memorizes the serial temperature history file F9 therein. Meanwhile, the transport-status-data generation unit 9a creates location data by using the GPS information file F1 and the trace file F7 and displays the location data.

In the delivery unit 17, the GPS receiver 37 receives each GPS signal from the GPS satellites. The delivery unit 17 then calculates location data based on each GPS signal, adds a unique device code thereto, and transmits the location data to the article management server 9 via the communication network N2.

It suffices that the unique device code provided to the GPS receiver 37 is, for example, a MAC address (Media Access Control address) of the GPS receiver or a unique management number set beforehand.

The logistics management server 19 is arranged in each warehouse that stores each article therein or in each warehouse that stores a plurality of articles therein, to execute control for shipping a relevant article to a client, upon reception of a request from the article management server 9.

<Functional Block Diagram of Article Management Server>

Figure 2:
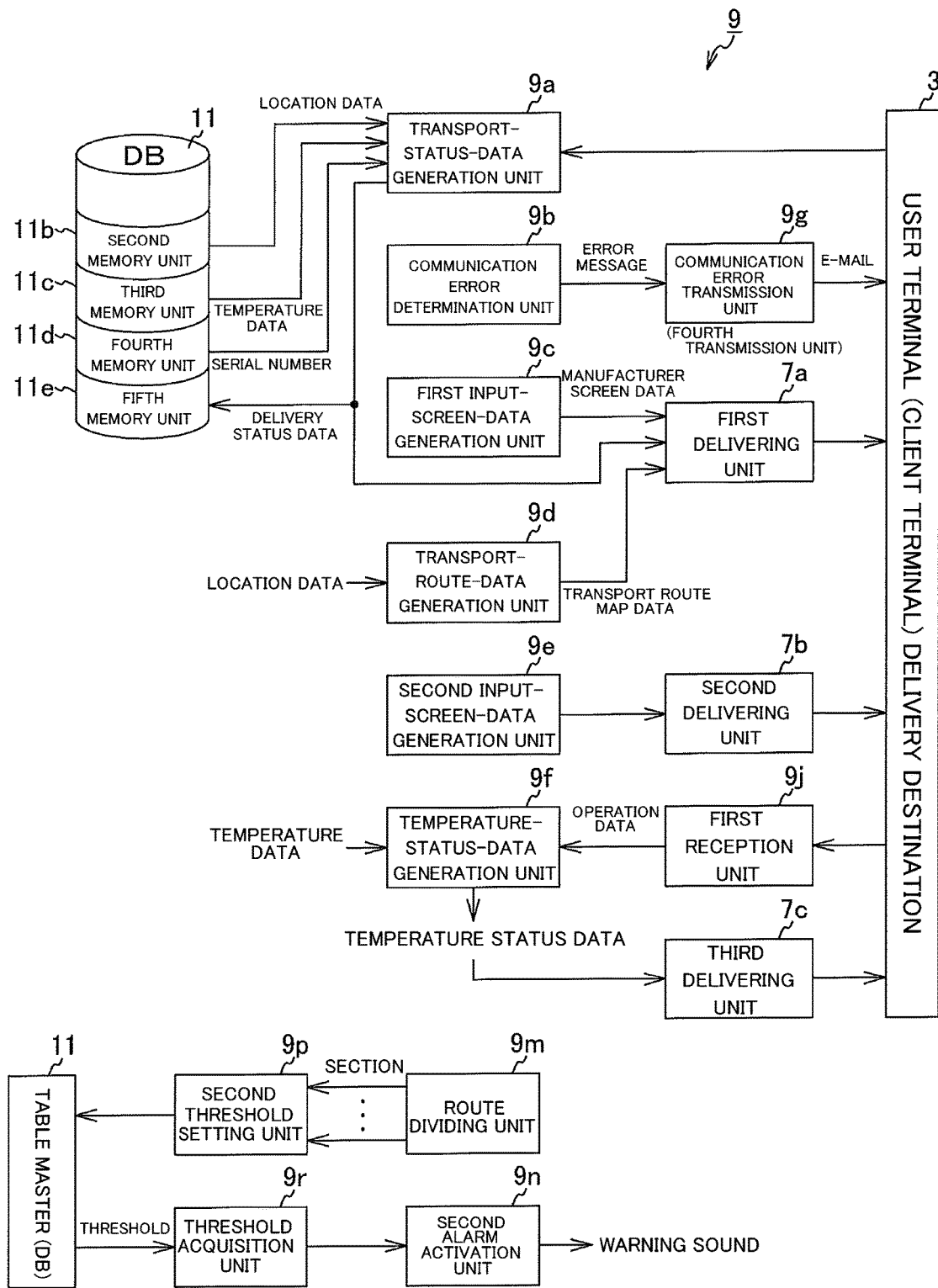
FIG. 2 is a functional block diagram of an article management server according to one embodiment of the present invention.

FIG. 2 is a functional block diagram of the article management server 9 according to one embodiment of the present invention.

The transport-status-data generation unit 9a acquires temperature information from the temperature history file F5 based on a unit number in the trace file F7 and date and time. Further, the transport-status-data generation unit 9a memorizes therein the acquired information of the temperature history file F5, linked with an article code, a serial number, and the status in the trace file F7.

The transport-status-data generation unit 9a generates transport status data by using a serial number received from a user terminal as a key, and the first delivering unit 7a delivers the transport status data generated by the transport-status-data generation unit 9a to the user terminal 3.

A communication error determination unit 9b determines whether the temperature data received from the delivery unit 17 regularly and/or irregularly and received data pertaining to the location data have a communication error.

When the communication error determination unit 9b determines that communicated data has a communication error, a communication error transmission unit 9g transmits an e-mail including a message indicating that a communication error has occurred to the client terminals 1 and 3.

The first input-screen-data generation unit 9c generates input screen data for inputting a serial number of the article.

The first delivering unit 7a delivers the input screen data generated by the first input-screen-data generation unit 9c to the user terminal 3, delivers the transport status data generated by the transport-status-data generation unit 9a to the user terminal 3, and delivers transport route map data generated by a transport-route-data generation unit 9d to the user terminal 3.

The transport-route-data generation unit 9d generates the transport route map data by combining a transport route of the article on map data, based on the location data acquired from the second memory unit 11b corresponding to the device code.

When the fifth memory unit 11e memorizes therein the transport status data generated by the transport-status-data generation unit 9a, the second input-screen-data generation unit 9e generates input screen data by adding thereto an input area for prompting a user to confirm the temperature status of the article.

The second delivering unit 7b delivers the input screen data generated by the second input-screen-data generation unit 9e to the user terminal 3.

A first reception unit 9j receives from the user terminal 3 operation data with respect to the input area added to the input screen data by the user terminal 3.

The temperature-status-data generation unit 9f generates temperature status data representing the temperature status based on the temperature data of the article acquired from the fifth memory unit 11e, by using the serial number as a key, corresponding to the operation data received by the first reception unit 9j.

The third delivering unit 7c delivers the temperature status data generated by the temperature-status-data generation unit 9f to the user terminal 3.

A route dividing unit 9m divides an entire route from a start point to an arrival point pertaining to delivery of the article into sections for each operation pertaining to the delivery.

A second threshold setting unit 9p sets thresholds of each of temperature data, liquid level data, vibration data, humidity data, and opening/closing number data in a master table 11, with respect to each section divided by the route dividing unit 9m.

A threshold acquisition unit 9r acquires each threshold corresponding to each location from the master table 11, based on location data calculated by the GPS receiver 37.

A second alarm activation unit 9n generates a warning sound, if at least one of the temperature data, the liquid level data, the vibration data, the humidity data, and the opening/closing state data is more in a critical region than the respective thresholds acquired by the threshold acquisition unit 9r.

<Vehicle>

Figure 3:
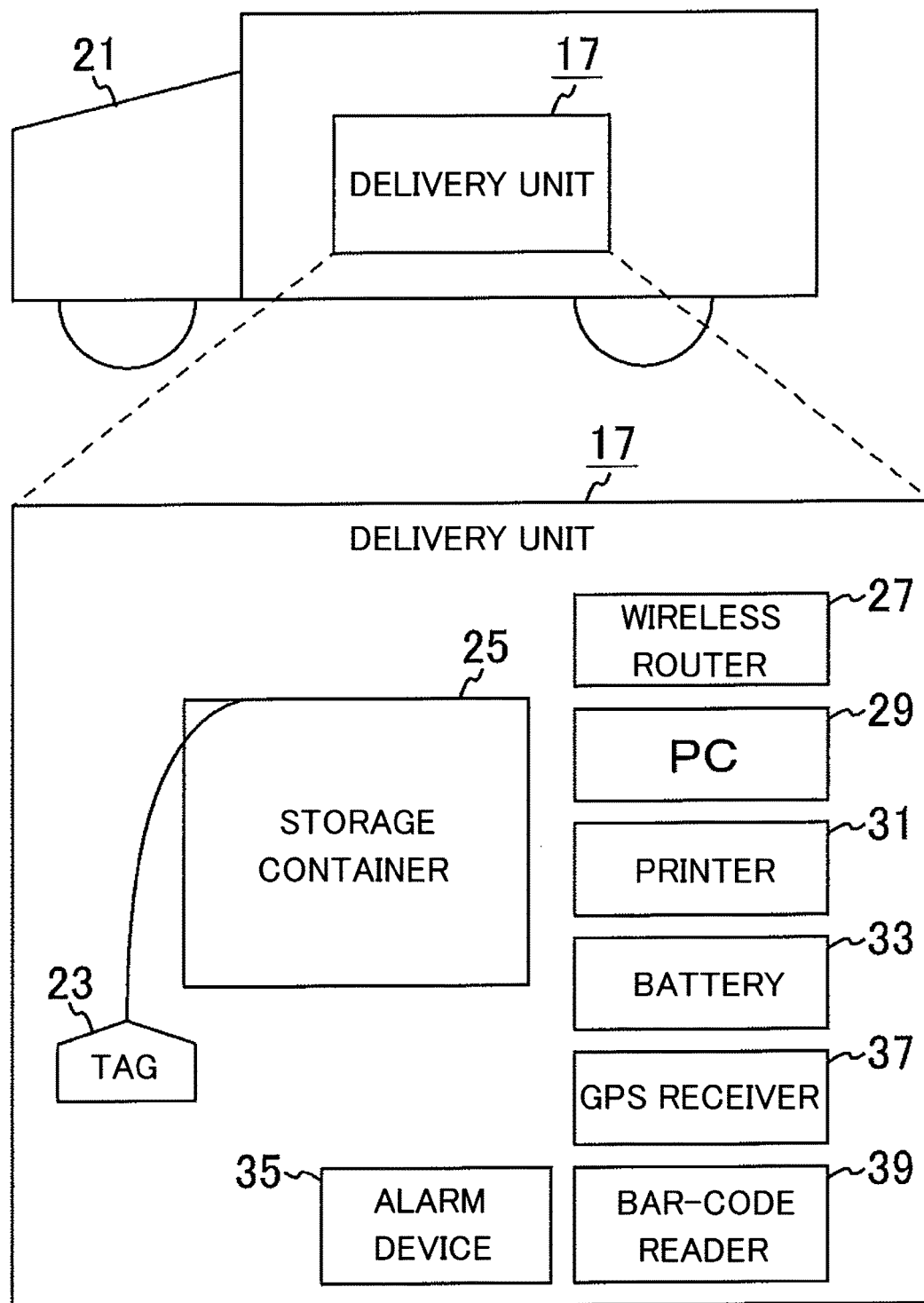
FIG. 3 is a diagram illustrating a vehicle on which a delivery unit according to one embodiment of the present invention is mounted.

FIG. 3 is a diagram illustrating a vehicle on which the delivery unit according to one embodiment of the present invention is mounted.

A vehicle 21 is mounted with the delivery unit 17 on a loading platform thereof. Further, the delivery unit 17 includes a storage container 25, a wireless router 27, a personal computer (hereinafter, PC) 29, a printer 31, a battery 33, an alarm device 35, the GPS receiver 37, and a bar-code reader 39.

A plurality of sensors described later are accommodated in or attached to the storage container 25, and a part of a tag string fastened to each article accommodated in the storage container 25 is pulled outside, and a tag 23 is fastened at the end thereof.

<Delivery Unit>

Figure 4:
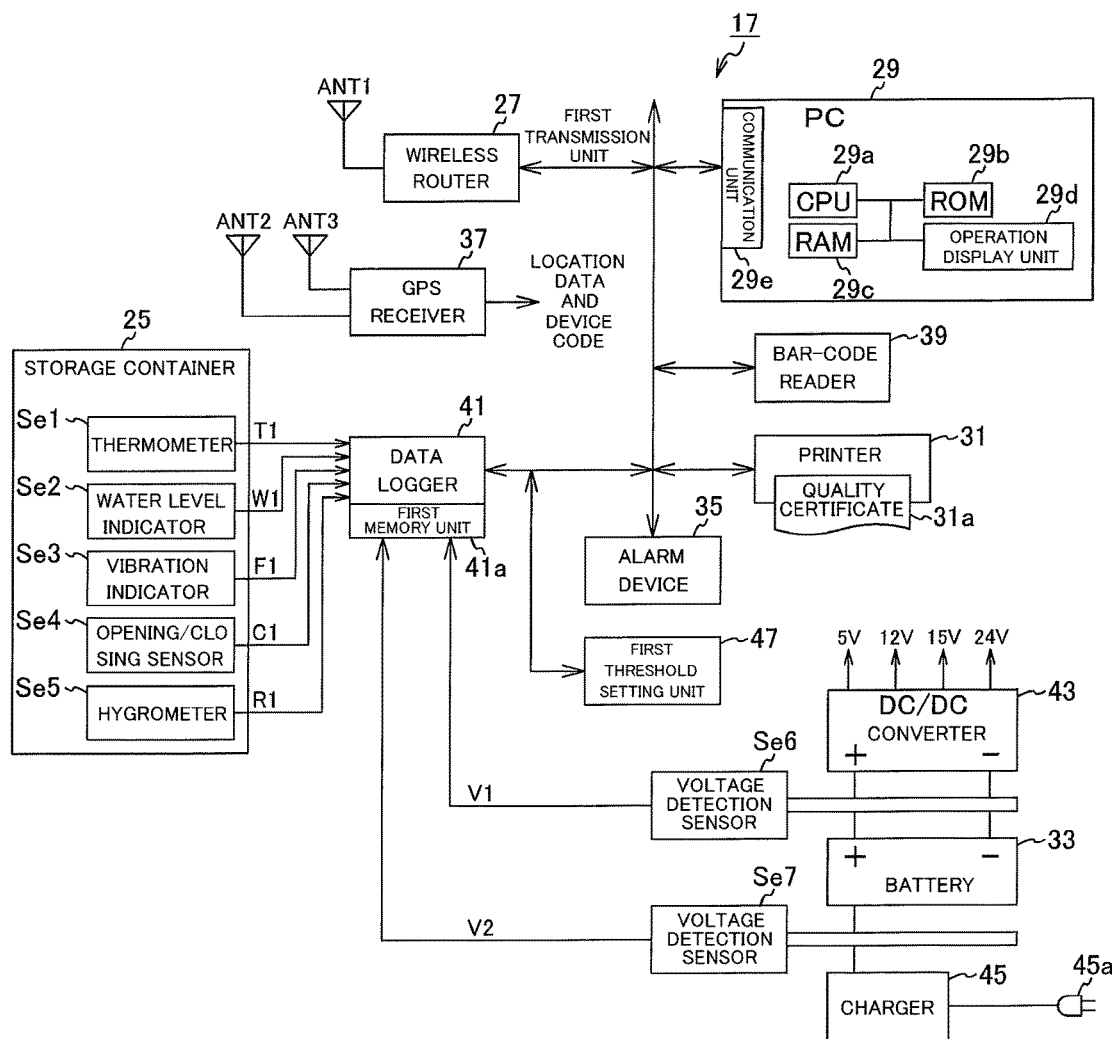
FIG. 4 is a diagram illustrating a hardware configuration of the delivery unit according to one embodiment of the present invention.

FIG. 4 is a diagram illustrating a hardware configuration of the delivery unit according to one embodiment of the present invention.

The delivery unit 17 includes the storage container 25, the wireless router 27, the PC 29, the printer 31, the battery 33, the alarm device 35, the GPS receiver 37, the bar-code reader 39, a data logger 41, a DC/DC converter 43, a charger 45, and a first threshold setting unit 47.

The wireless router 27 accesses a plurality of 3G/4G lines arranged on the road where the vehicle 21 runs, and is connected to the PC 29 to connect the PC 29 and the article management server 9 with each other.

The PC 29 includes a CPU 29a, a ROM 29b, a RAM 29c, an operation display unit 29d, and a communication unit 29e.

The CPU 29a controls the entire operation of the delivery unit 17 by using the RAM 29c as a work memory, according to a program memorized beforehand in the ROM 29b.

The ROM 29b is a read-only non-volatile memory medium, and stores therein firmware and various kinds of data.

The RAM 29c is a volatile memory medium capable of high-speed read and write of information and can be used as a work memory.

The operation display unit 29d includes a screen and key buttons for displaying a menu for performing various setting and mode selection, and receives various kinds of operation requests from a user.

The communication unit 29e has a USB interface, and transmits and receives data to and from the article management server 9 via the wireless router 27 and the communication network N2.

The printer 31 prints a quality certificate 31a on a recording medium such as a sheet according to a printing job received from the PC 29.

The GPS receiver 37 receives a radio signal from a plurality of GPS satellites via an antenna ANT 2 to calculate location information of the delivery unit 17, and transmits the calculated location information to the article management server 9 via an antenna ANT 3 and/or the network N2. In FIG. 4, the GPS receiver 37 is not connected to the PC 29. However, the GPS receiver 37 may be connected to the PC 29 to output the location information calculated by the GPS receiver 31 to the PC 29.

The storage container 25 can accommodate therein a plurality of articles, and includes various kinds of sensors Se1 to Se5 therein or attached to the outside thereof.

The bar-code reader 39 reads a bar-code and outputs data to the PC 29.

The data logger 41 collects measurement data measured by each sensor, stores various kinds of data therein, and outputs the stored various kinds of data to the PC 29 according to readout request of the PC 29. The data logger 41 includes a first memory unit 41*a* that memorizes therein temperature data measured by a thermometer Se1 in time series.

The charger 45 connects to, for example, an AC power supply provided in the vehicle 21 or an AC power supply provided in a delivery center via a plug 45*a*, as needed, to convert AC power supplied from the AC power supply to DC power, and connects the DC power to each electrode of the battery 33 to charge the battery 33.

When the charger 45 is connected to each electrode (ON), the battery 33 is charged with the DC power supplied from the charger 45, and when connection between the charger 45 and the respective electrodes is released (OFF), the battery 33 discharges the DC power and supplies the DC power to the DC/DC converter 43.

The DC/DC converter 43 converts the DC power supplied from the battery 33 to DC power of, for example, four kinds of voltage levels (5V, 12V, 15V, and 24V) and supplies the DC power to each unit in the delivery unit 17.

The first threshold setting unit 47 sets a threshold of each of the temperature data, the liquid level data, the vibration data, the humidity data, and the opening/closing number data.

The thermometer Se1 is provided in the storage container 25 to measure the ambient temperature in the storage container 25, and outputs temperature data to the data logger 41.

A liquid level indicator Se2 is provided in the storage container 25 to measure a liquid level of a liquefied refrigerant, for example, liquid nitrogen and outputs liquid level data to the data logger 41.

A vibration indicator Se3 is provided outside the storage container 25 to measure vibrations applied to the storage container 25, and outputs vibration data to the data logger 41.

An opening/closing sensor Se4 is provided in the storage container 25 to detect whether a lid of the storage container 25 is in an opened state or a closed state, and outputs opening/closing data to the data logger 41.

A hygrometer Se5 is provided in the storage container 25 to measure the ambient humidity in the storage container 25, and outputs humidity data to the data logger 41.

A voltage detection sensor Se6 measures a voltage of DC power supplied from the battery 33 to the DC/DC converter 43, and outputs voltage data to the data logger 41.

A voltage detection sensor Se7 measures a voltage of DC power supplied from the charger 45 to the battery 33, and outputs voltage data to the data logger 41.

<Functional Block Diagram of User Terminal>

Figure 5:
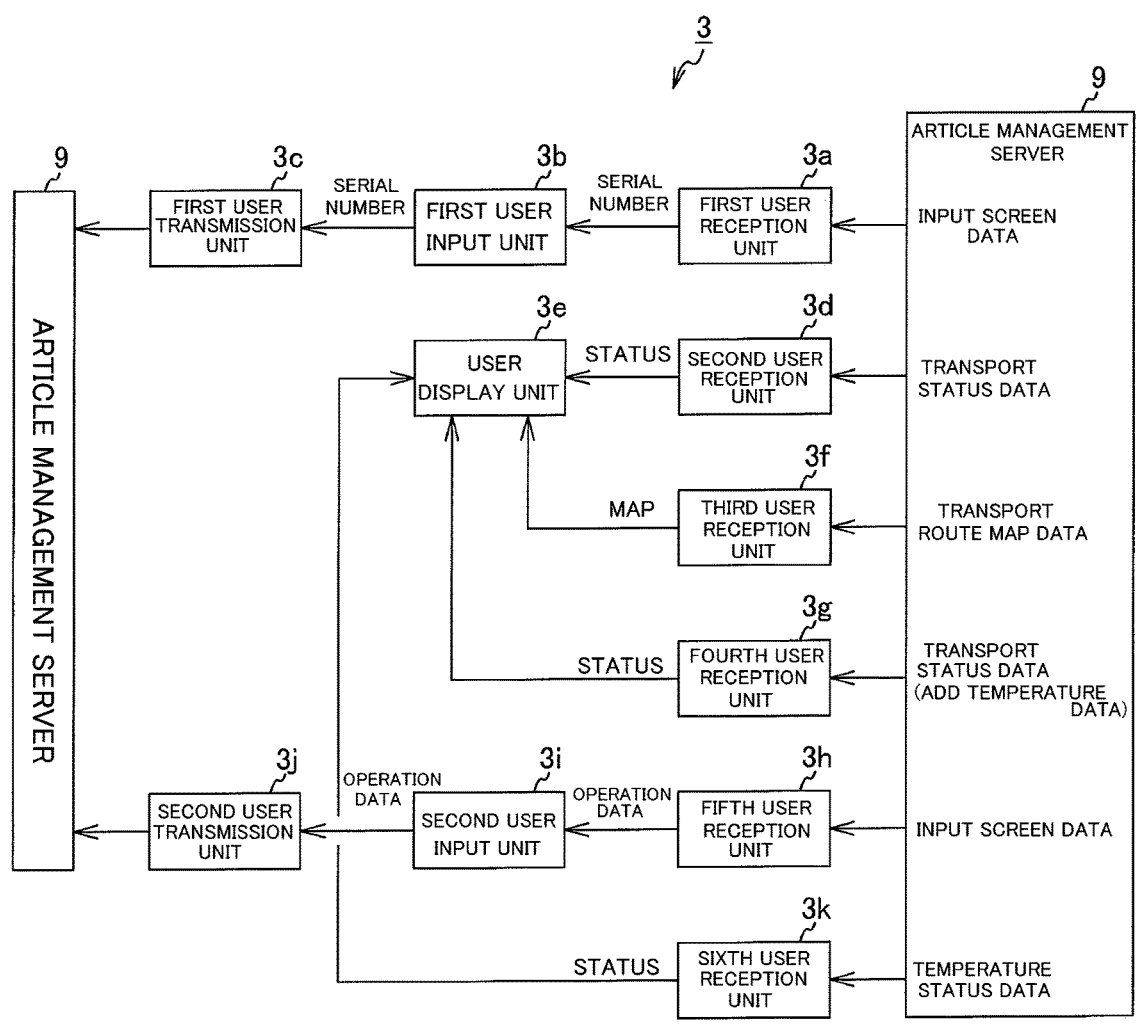
FIG. 5 is a functional block diagram of a user terminal according to one embodiment of the present invention.

FIG. 5 is a functional block diagram of a user terminal according to one embodiment of the present invention.

A first user reception unit 3*a* receives input screen data from the article management server 9.

A first user input unit 3*b* inputs a serial number of an article to the input screen data received by the first user reception unit 3*a*.

A first user transmission unit 3*c* transmits the serial number input by the first user input unit 3*b* to the article management server 9.

A second user reception unit 3*d* receives transport status data of the article from the article management server 9.

A user display unit 3*e* displays thereon transport status data received by the second user reception unit 3*d*, transport route map data received by a third user reception unit 3*f*, transport status data received by a fourth user reception unit 3*g*, and temperature status data representing the temperature status of the article, received by a sixth user reception unit 3*k*.

The third user reception unit 3*f* receives the transport route map data from the article management server 9.

The fourth user reception unit 3*g* receives the transport status data added with the latest temperature data of the article from the article management server 9.

A fifth user reception unit 3*h* receives input screen data added with an input area for prompting a user to confirm the temperature status of the article from the article management server 9.

A second user input unit 3*i* inputs operation data with respect to the input area added to the input screen data received by the fifth user reception unit 3*h*.

A second user transmission unit 3*j* transmits the operation data input by the second user input unit 3*i* to the article management server 9.

The sixth user reception unit 3*k* receives the temperature status data representing the temperature status of the article from the article management server 9.

<Configuration of GPS System>

Figures 6A, 6B:
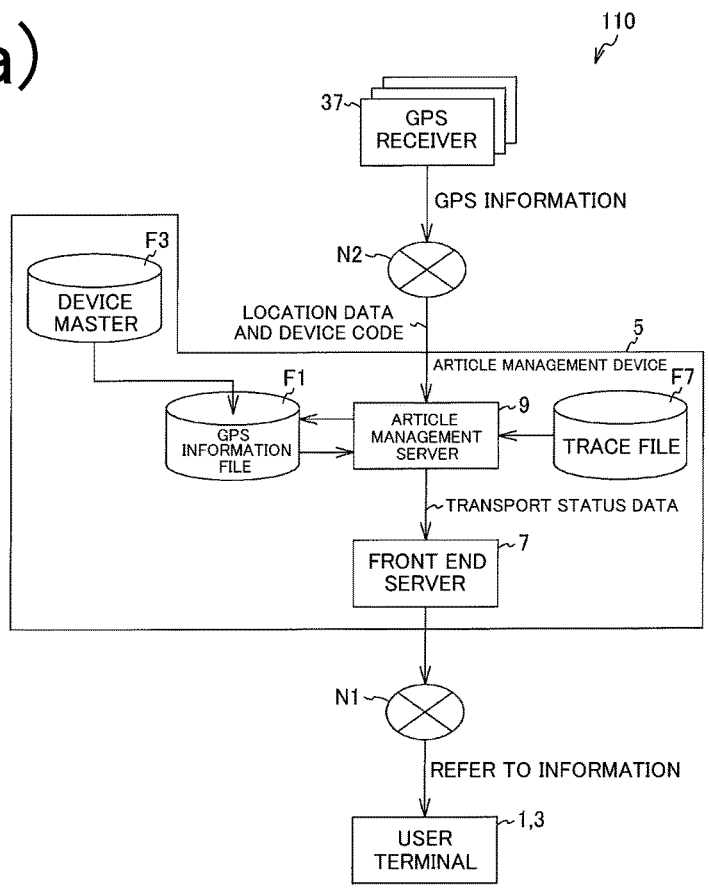
FIG. 6(a) is a diagram illustrating a configuration of a GPS system of an article according to one embodiment of the present invention, and (b) is a diagram illustrating a unit-device master maintenance screen to be used for registering a delivery unit in association with a GPS receiver according to one embodiment of the present invention.

FIG. 6(*a*) is a diagram illustrating a configuration of a GPS system of an article according to one embodiment of the present invention. FIG. 6(*b*) is a diagram illustrating a unit-device master maintenance screen to be used for registering a delivery unit in association with a GPS receiver.

A GPS system 110 includes the GPS receivers 37, the communication networks N1 and N2, the article management server 9, the front end server 7, the GPS information file F1, a device master F3, the trace file F7, and the client terminals 1 and 3.

The GPS information file F1 is memorized in the second memory unit 11*b*, and acquires location information from the GPS receiver 37 to store therein a unit number, a measured date, a measured time, a device code (a unique device code held by the GPS receiver 37), a latitude, and a longitude.

The device master F3 stores therein a device type, a device code, and a unit number. The device master F3 is basic data in which a device code of the GPS receiver 37 and a unit number of the delivery unit 17 are registered in association with each other.

When "GPS" is input as the device type to the unit-device master maintenance screen, a device code, a unit number, a used flag, an updated date, and the like are displayed.

When update of the status representing the current operation contents occurs, the article management server 9 transmits the location information and the unit number memorized in the GPS information file F1 (the second memory unit 11*b*) in association with each other to the front end server 7, and transmits these pieces of information to the client terminals 1 and 3 via the communication network N1.

<Configuration of Temperature Data Acquisition System>

Figure 7:
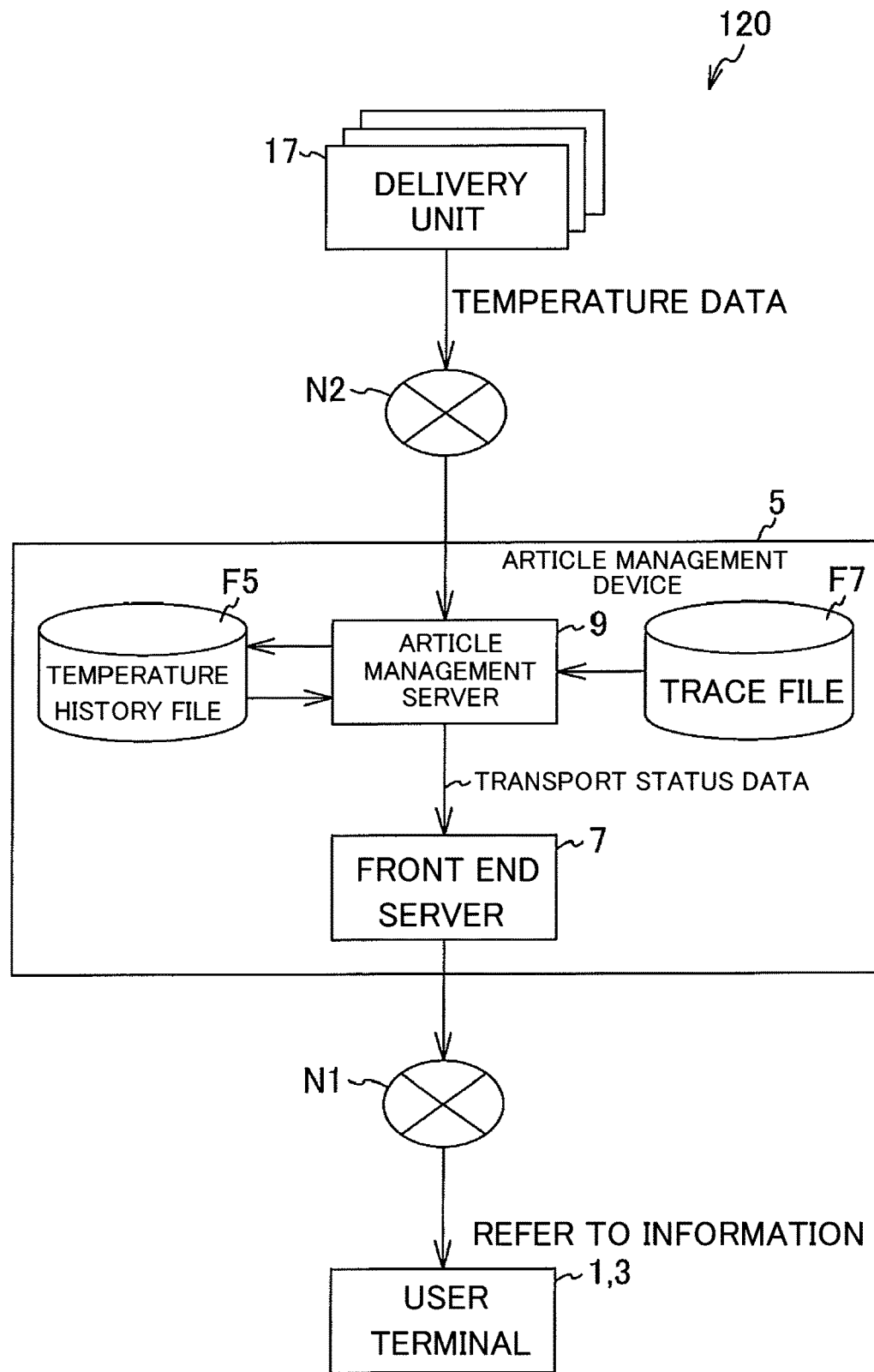
FIG. 7 is a diagram illustrating a configuration of a temperature data acquisition system according to one embodiment of the present invention.

FIG. 7 is a diagram illustrating a configuration of a temperature data acquisition system according to one embodiment of the present invention.

A temperature data acquisition system 120 includes the delivery units 17, the communication networks N1 and N2, the article management server 9, the front end server 7, the temperature history file F5, the trace file F7, and the client terminals 1 and 3.

The temperature history file F5 is memorized in the third memory unit 11*c*, and stores the temperature data acquired from the data logger 41 together with a unit number and a date and time.

The trace file F7 is memorized in the fourth memory unit 11d, and stores therein a product code, a date and time, a serial number, a unit number, and a status.

When update of the status representing the operation contents occurs, the article management server 9 transmits the temperature data and the unit number memorized in the temperature history file F5 in association with each other to the front end server 7, and transmits these pieces of information to the client terminals 1 and 3 via the communication network N1.

<Association in GPS Information File>

Figure 8:
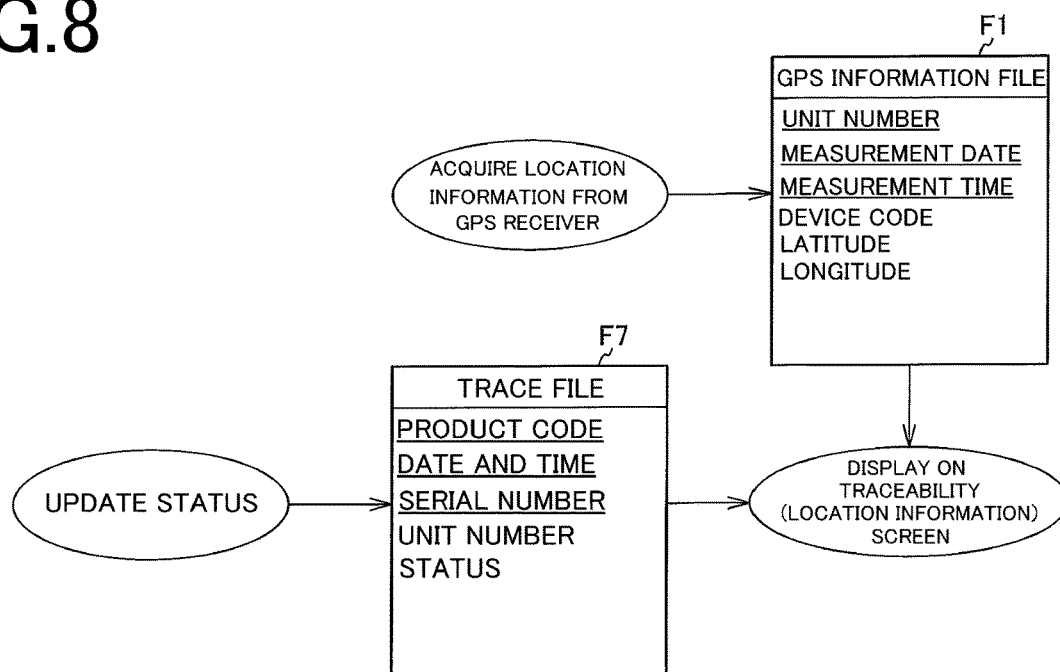
FIG. 8 is a diagram illustrating association in a GPS file processed by a transport-status-data generation unit according to one embodiment of the present invention.

FIG. 8 is an ER diagram illustrating association in the GPS information file processed by the transport-status-data generation unit according to one embodiment of the present invention.

The transport-status-data generation unit 9a in the article management server 9 acquires location information from the GPS receiver 37 provided in the delivery unit 17, adds a unit number, a measured date, a measured time, a latitude, and a longitude to the device code of the GPS receiver 37 to generate the GPS information file F1, and memorizes the GPS information file F1 in the second memory unit 11b.

When the status information representing the operation contents transmitted from the PC 29 in the delivery unit 17 is updated, the article management server 9 updates the unit number and the status information for each of the article code, the date and time, and the serial number memorized in the trace file F7 in the fourth memory unit lid.

When the status information representing the operation contents transmitted by the PC 29 in the delivery unit 17 is updated, the transport-status-data generation unit 9a in the article management server 9 reads the serial number and the unit number from the trace file F7 memorized in the database DB 11.

Next, the transport-status-data generation unit 9a in the article management server 9 acquires a unit number corresponding to the serial number from the trace file F7, by using the serial number acquired from the user terminal as a key.

Further, the transport-status-data generation unit 9a uses the unit number as a key to extract a measured date, a measured time, and location information (latitude and longitude) corresponding to the unit number from the GPS information file F1 in the second memory unit 11b, and displays the location information (latitude and longitude) on a traceability (location information) screen.

<Association in Temperature Information File>

Figure 9:
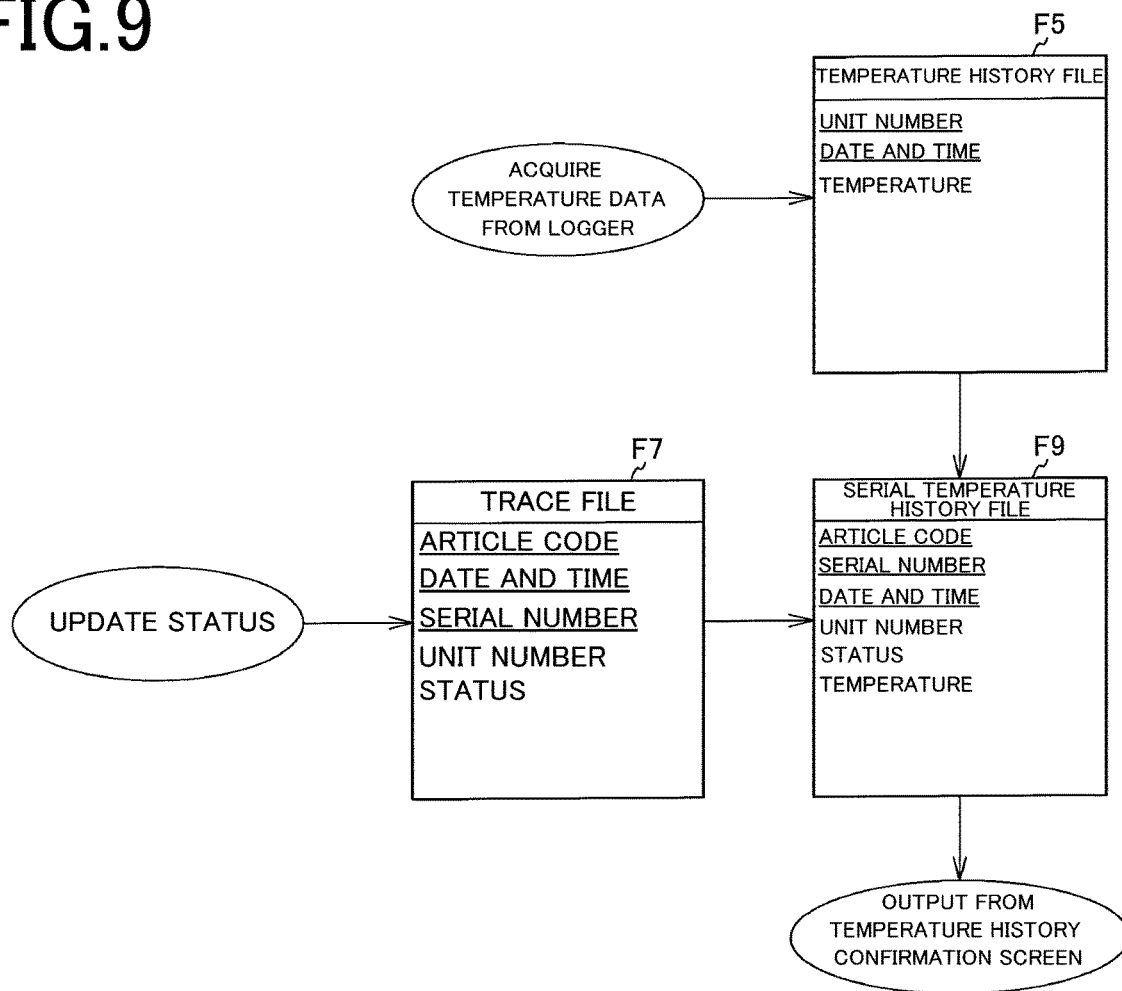
FIG. 9 is a diagram illustrating association in a temperature file processed by the transport-status-data generation unit according to one embodiment of the present invention.

FIG. 9 is an ER diagram illustrating association in the temperature information file processed by the transport-status-data generation unit according to one embodiment of the present invention.

When the temperature data added with a unit number and a date and time is received from the data logger 41 provided in the delivery unit 17, the article management server 9 memorizes the temperature data in the temperature history file F5 corresponding to the unit number.

When the status information representing the operation contents transmitted by the PC 29 in the delivery unit 17 is updated, the article management server 9 updates the unit number and the status information for each of the article code, the date and time, and the serial number memorized in the trace file F7 in the fourth memory unit lid.

Further, the article management server 9 uses the unit number included in the trace file F7 as a key to extract the temperature data from the temperature history file F5 (the third memory unit 11c) having the key, and updates and generates the serial temperature history file F9, and memorizes the serial temperature history file F9 in the database DB 11.

At this time, the article management server 9 uses the unit number included in the trace file F7 as a key to extract the status from the trace file F7, and updates the serial temperature history file F9.

Further, the article management server 9 displays a result thereof on a temperature history confirmation screen (FIG. 20(b)) based on the serial temperature history file F9.

<Menu Screen>

Figure 10A:
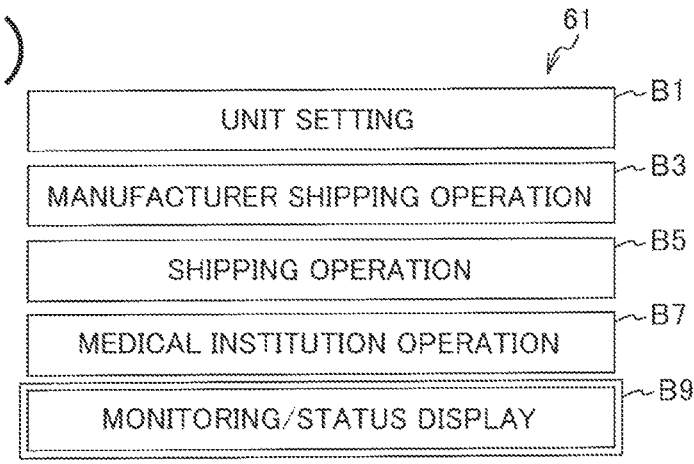
FIGS. 10(a) to (c) are diagrams illustrating the flow of a PC screen for outputting a temperature trace table according to one embodiment of the present invention.

FIG. 10(a) is a diagram illustrating an example of a menu screen to be displayed on the PC in the delivery unit according to one embodiment of the present invention.

As illustrated in FIG. 10(a), a "UNIT SETTING" button B1, a "MANUFACTURER SHIPPING OPERATION" button B3, a "SHIPPING OPERATION" button B5, a "MEDICAL INSTITUTION OPERATION" button B7, and a "MONITORING/STATUS DISPLAY" button B9 are displayed as a menu screen 61 on the PC 29 in the delivery unit 17.

<Monitoring/Status Display Screen>

Figure 10B:
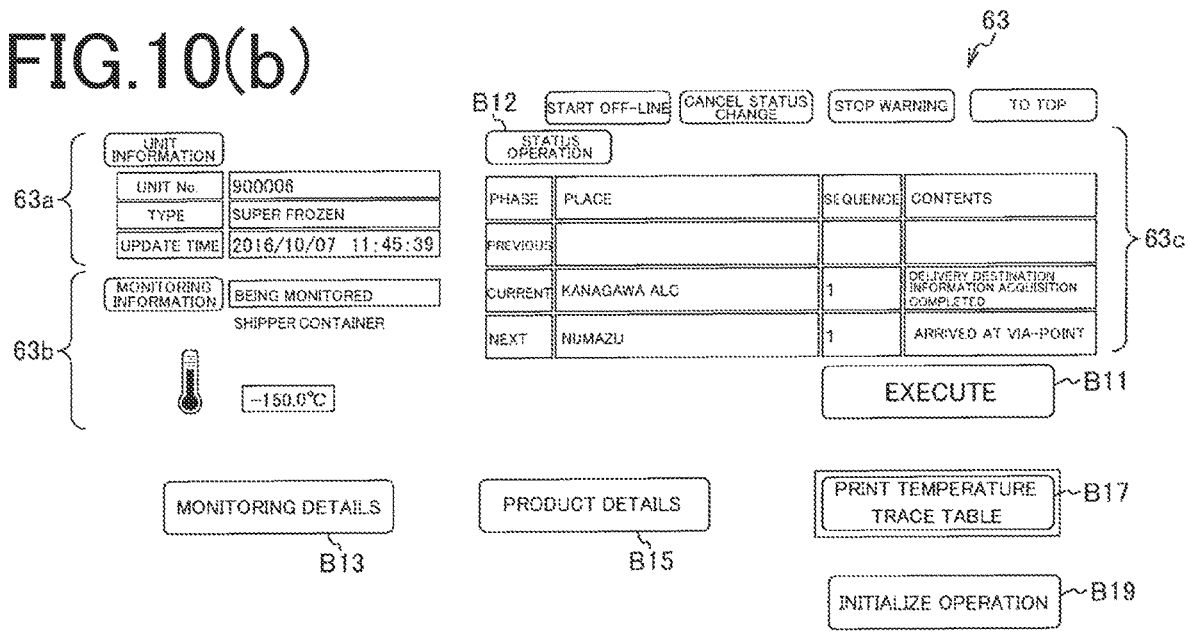

FIG. 10(b) is a diagram illustrating a monitoring/status display screen to be displayed on the PC in the delivery unit according to one embodiment of the present invention.

In the PC 29, when the "MONITORING/STATUS DISPLAY" button B9 illustrated in FIG. 10(a) is pressed, a monitoring/status display screen 63 illustrated in FIG. 10(b) is displayed.

A unit No., a type, an update time, and a temperature in the storage container 25 (temperature) 63b as monitoring information are displayed on the monitoring/status display screen 63.

A "STATUS OPERATION" button B12, a phase, a place, an order, and contents are displayed on the monitoring/status display screen 63, and an "EXECUTE" button B11 is also displayed thereon. When the "STATUS OPERATION" button B12 is pressed, the place, the order, and the operation contents can be changed, and when the "EXECUTE" button B11 is pressed, the latest place, order, and operation contents are transmitted from the PC 29 in the delivery unit 17 to the article management server 9.

Further, a "MONITORING DETAILS" button B13, a "PRODUCT DETAILS" button B, a "PRINT TEMPERATURE TRACE TABLE" button B17, and an "INITIALIZE OPERATION" button B19 are displayed below the monitoring/status display screen 63.

<Print Range Screen>

Figure 10C:
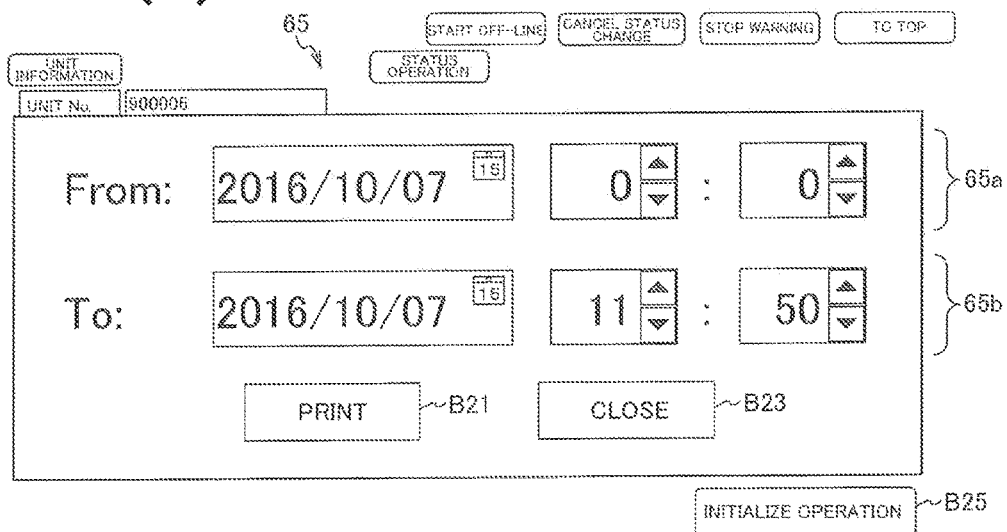

FIG. 10(c) is a diagram illustrating a print range screen to be displayed on the PC in the delivery unit according to one embodiment of the present invention.

When the "PRINT TEMPERATURE TRACE TABLE" button B17 illustrated in FIG. 10(b) is pressed, a print range specifying screen 65 illustrated in FIG. 10(c) is displayed.

A date/time box 65a for inputting start date and time, a date/time box 65b for inputting an end date and time, a "PRINT" button B21, a "CLOSE" button B23, and an "INITIALIZE OPERATION" button B25 are displayed on the print range specifying screen 65.

<Print Data Editing Process>

Figure 11:
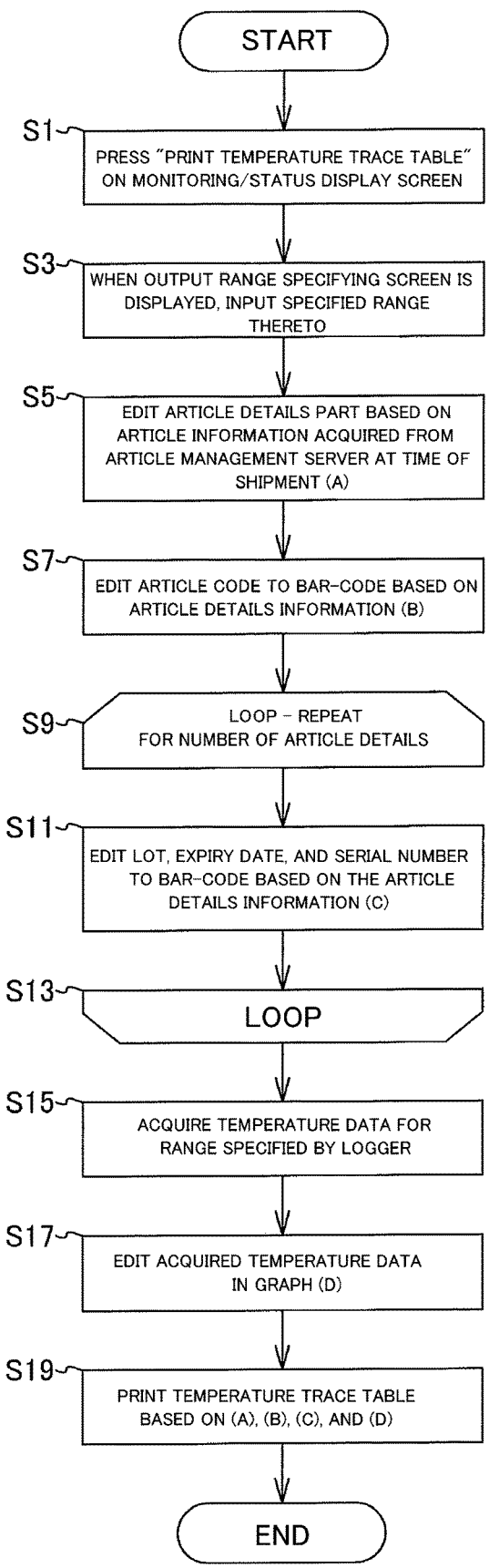
FIG. 11 is a flowchart for outputting the temperature trace table according to one embodiment of the present invention.

FIG. 11 is a flowchart for outputting a temperature trace table according to one embodiment of the present invention.

At Step S1, on the PC 29 in the delivery unit 17, when a user presses the "PRINT TEMPERATURE TRACE TABLE" button B17 on the monitoring/status display screen (FIG. 10(b)), the process proceeds to Step S3.

At Step S3, since the print range specifying screen 65 (FIG. 10(c)) is displayed on the PC 29, the user inputs a specified range on the print range specifying screen 65, and transmits the specified range to the article management server 9. At this time, it is assumed that when the print range specifying screen 65 (FIG. 10(c)) is displayed, the user inputs a start date and time in the date/time box 65a, inputs an end date and time in the date/time box 65b, and presses the "PRINT" button B21.

Figure 12:
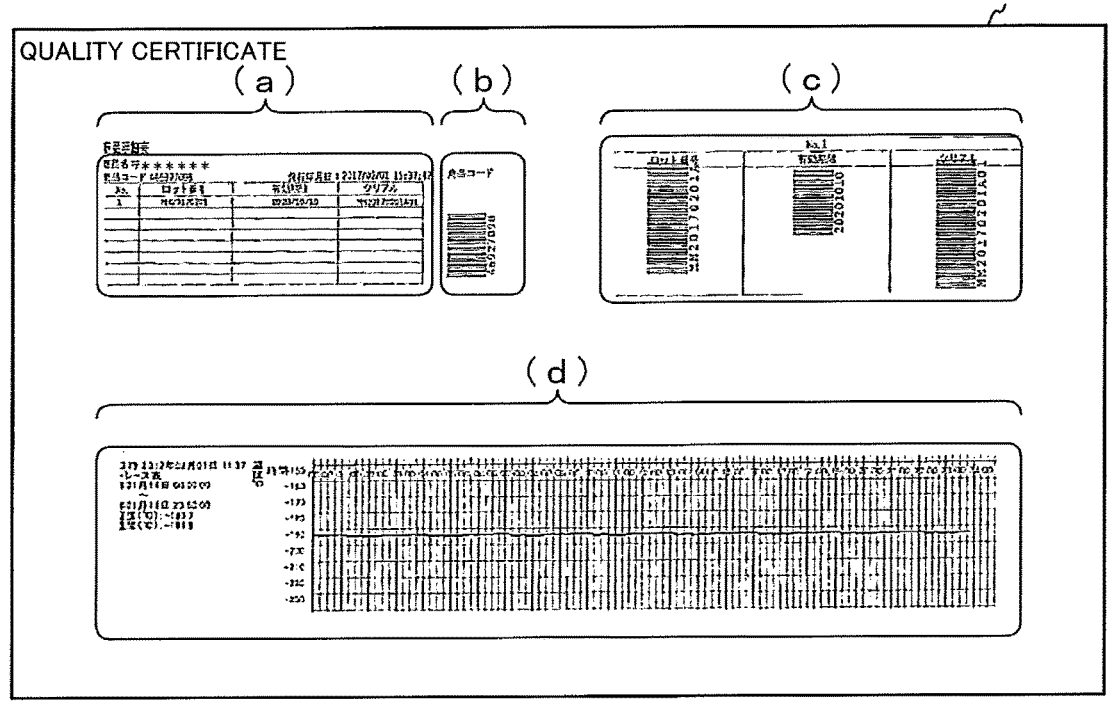
FIG. 12 is a diagram illustrating results of outputting the temperature trace table according to one embodiment of the present invention.

At Step S5, on the PC 29, the user edits a article details part ((a) in FIG. 12) based on the product details information acquired from the article management server 9 at the time of shipment (A).

At Step S7, on the PC 29, the user edits a product code to a bar-code ((b) in FIG. 12) based on the article details information (B).

At Step S9, on the PC 29, the above processes are repeated as loop processing for the number of article details.

At Step S11, on the PC 29, the user edits a lot, an expiry date, and a serial number to a bar-code ((c) in FIG. 12) based on the article details information (C).

At Step S13, on the PC 29, after the processes are repeated for the number of article details, the user ends the loop processing to proceed to Step S15.

At Step S15, on the PC 29, the article management server 9 acquires the temperature data (R1) for a range specified by the data logger 41 in the delivery unit 17.

At Step S17, on the PC 29, the user edits a graph ((d) in FIG. 12) based on the acquired temperature data (D).

At Step S19, on the PC 29, the user edits quality certificate data based on the edited pieces of data (A), (B), (C), and (D), and supplies the quality certificate data to the printer 31, to print a quality certificate 31a (FIG. 12) by the printer 31.

<Quality Certificate>

FIG. 12 is a diagram illustrating respective parts of a quality certificate output from the printer in the delivery unit according to one embodiment of the present invention.

When the "PRINT" button B21 included in the print range specifying screen 65 illustrated in FIG. 10(c) is pressed, the quality certificate 31a illustrated in FIG. 12 is printed.

As illustrated in FIG. 12, a product code (b) such as a lot number, an expiry date, and a serial number (a), and a bar-code (c) such as a lot number, an expiry date, and a serial number as the article code, and a temperature graph (d) are arranged in the quality certificate 31a.

<Threshold Setting>

Figure 13:
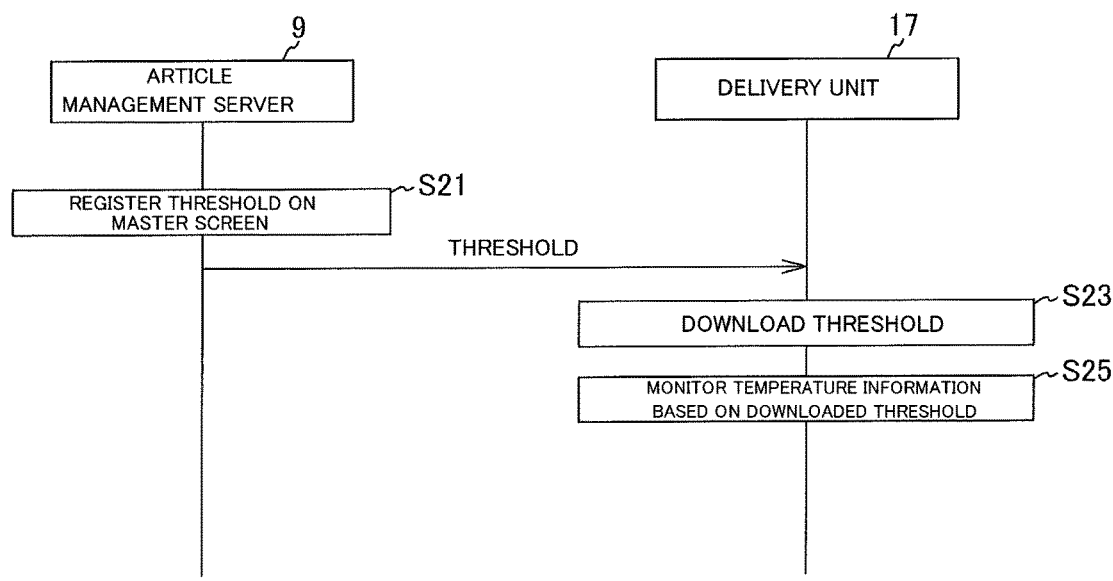
FIG. 13 is a sequence diagram of threshold setting according to one embodiment of the present invention.

FIG. 13 is a sequence diagram of threshold setting according to one embodiment of the present invention.

At Step S21, the article management server 9 registers a threshold on a master screen.

At Step S23, the delivery unit 17 downloads the threshold registered by the article management server 9 via the communication network N2.

At Step S25, the delivery unit 17 monitors the temperature information based on the downloaded threshold.

<Alarm Activating Process>

Figure 14:
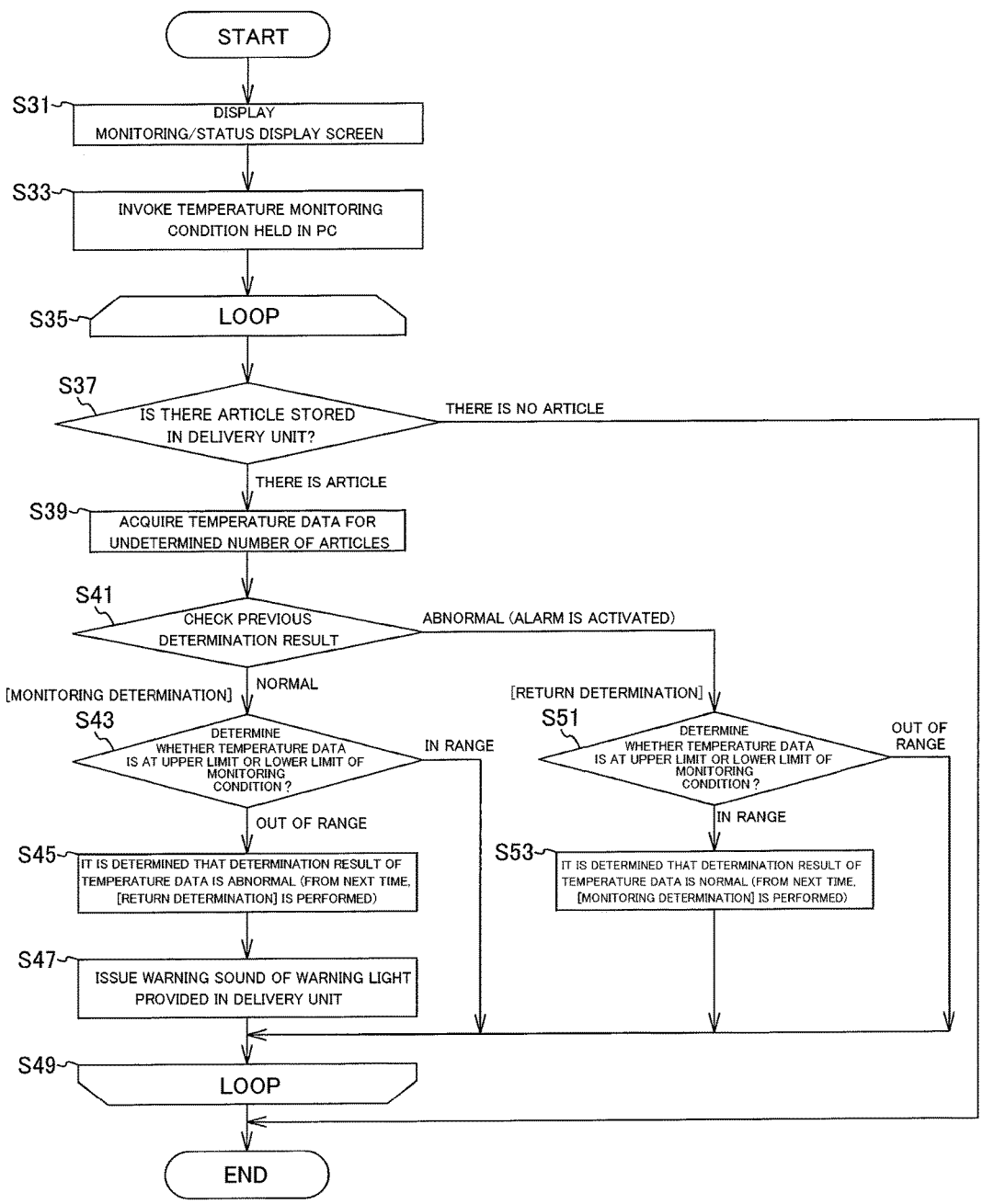
FIG. 14 is a flowchart representing an alarm activating process performed by using a PC in the delivery unit according to one embodiment of the present invention.

FIG. 14 is a flowchart representing an alarm activating process performed by using the PC 29 in the delivery unit 17 according to one embodiment of the present invention.

At Step S31, a monitoring/status display screen (FIG. 10(b)) is displayed on the PC 29 in the delivery unit 17.

Figure 15:
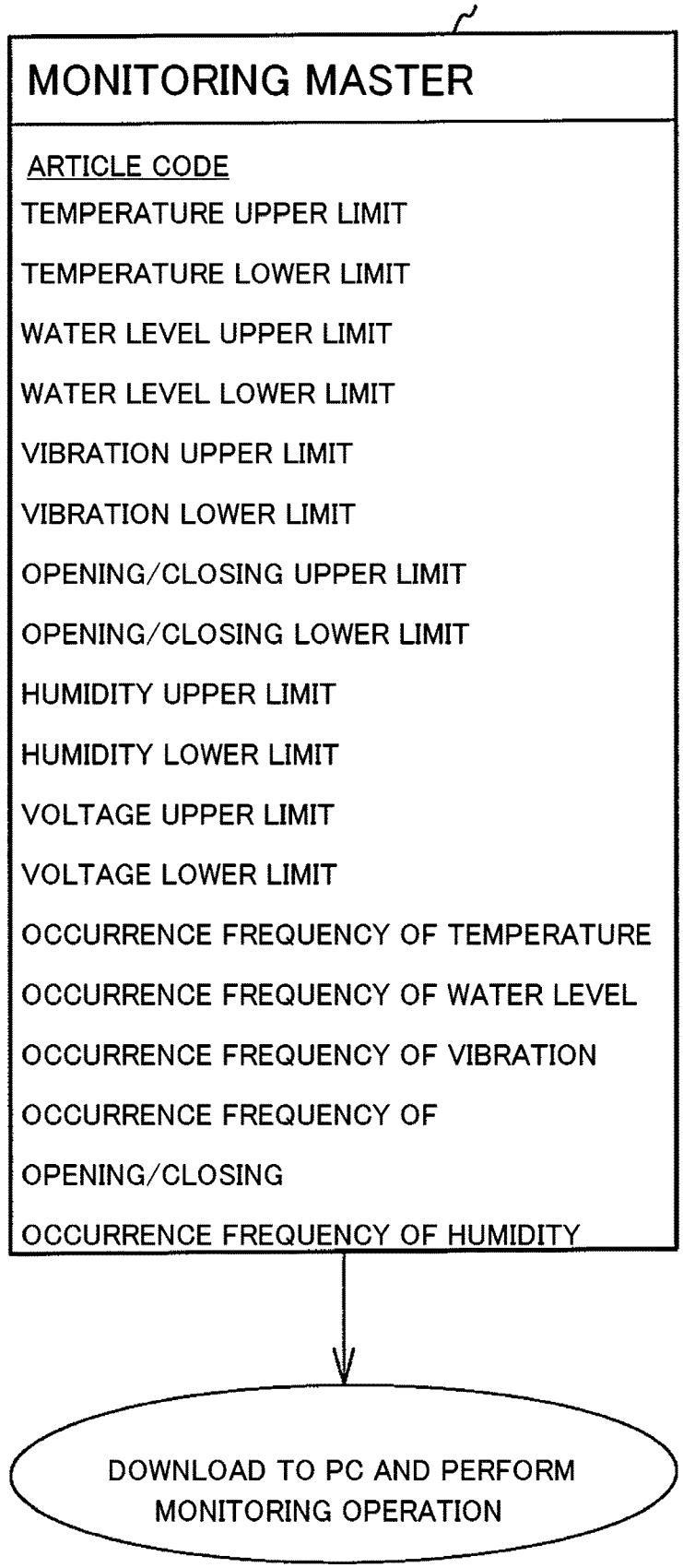
FIG. 15 is an ER diagram of a monitoring threshold according to one embodiment of the present invention.

At Step S33, on the PC 29, a temperature monitoring condition held in the PC 29 is invoked from a monitoring master (FIG. 15).

At Step S35, on the PC 29, the following loop processing is repeated.

At Step S37, on the PC 29, a storage state of products in the delivery unit 17 is monitored. As a result of monitoring, if there is a product (THERE IS ARTICLE at Step S37), the process proceeds to Step S39, and if not (THERE IS NO ARTICLE at Step S37), the process ends.

At Step S39, on the PC 29, pieces of temperature data for the undetermined number of articles are acquired.

At Step S41, a previous determination result is checked, and if the previous determination result is normal (normal at Step S41), the process proceeds to Step S43, and if the previous determination result is abnormal (abnormal at Step S41), the process proceeds to Step S51.

At Step S43, on the PC 29, it is determined whether the temperature data is at an upper limit or a lower limit of the monitoring condition in order to perform monitoring determination. When the determination result of the temperature data is out of range (out of range at Step S43), the process proceeds to Step S45, and when the determination result of the temperature data is within range (within range at Step S43), the process proceeds to Step S49.

At Step S45, on the PC 29, it is determined that the determination result of the temperature data is abnormal. In the case of moving to step S45 as a subsequent step, "return determination" is performed.

At Step S47, on the PC 29, an alarm of the alarm device 35 provided in the delivery unit 17 is activated.

At Step S49, on the PC 29, after alarm activation is repeated, the loop processing ends to proceed to Step S35.

Meanwhile, at Step S51, on the PC 29, it is determined whether the temperature data is at an upper limit or a lower limit of the monitoring condition in order to perform return determination. When the determination result is out of range (out of range at Step S51), the process proceeds to Step S49, and when the determination result is within range (within range at Step S51), the process proceeds to Step S53.

At Step S53, on the PC 29, it is determined that the determination result is normal. In the case of moving to step S45 as a subsequent step, "monitoring determination" is performed.

In the flowchart illustrated in FIG. 14, a processing flow only for the temperature data has been described. However, the liquid level data, the vibration data, the opening/closing data, the humidity data, and the voltage data are each processed in a similar flow.

<Monitoring Threshold>

FIG. 15 is an ER diagram of a monitoring threshold according to one embodiment of the present invention.

The PC 29 in the delivery unit 17 includes a monitoring master 29a, in which a temperature upper limit, a temperature lower limit, a liquid level upper limit, a liquid level lower limit, a vibration upper limit, a vibration lower limit, an opening/closing upper limit, an opening/closing lower limit, a humidity upper limit, a humidity lower limit, a voltage upper limit, a voltage lower limit, an occurrence frequency of temperature, an occurrence frequency of liquid level, an occurrence frequency of vibration, an occurrence frequency of opening/closing, an occurrence frequency of humidity, and an occurrence frequency of voltage are stored therein for each product code. A monitoring threshold corresponding to a product code is selected from the monitoring master, and downloaded to the PC 29 to perform a monitoring operation.

<Notification Function>

Figure 16:
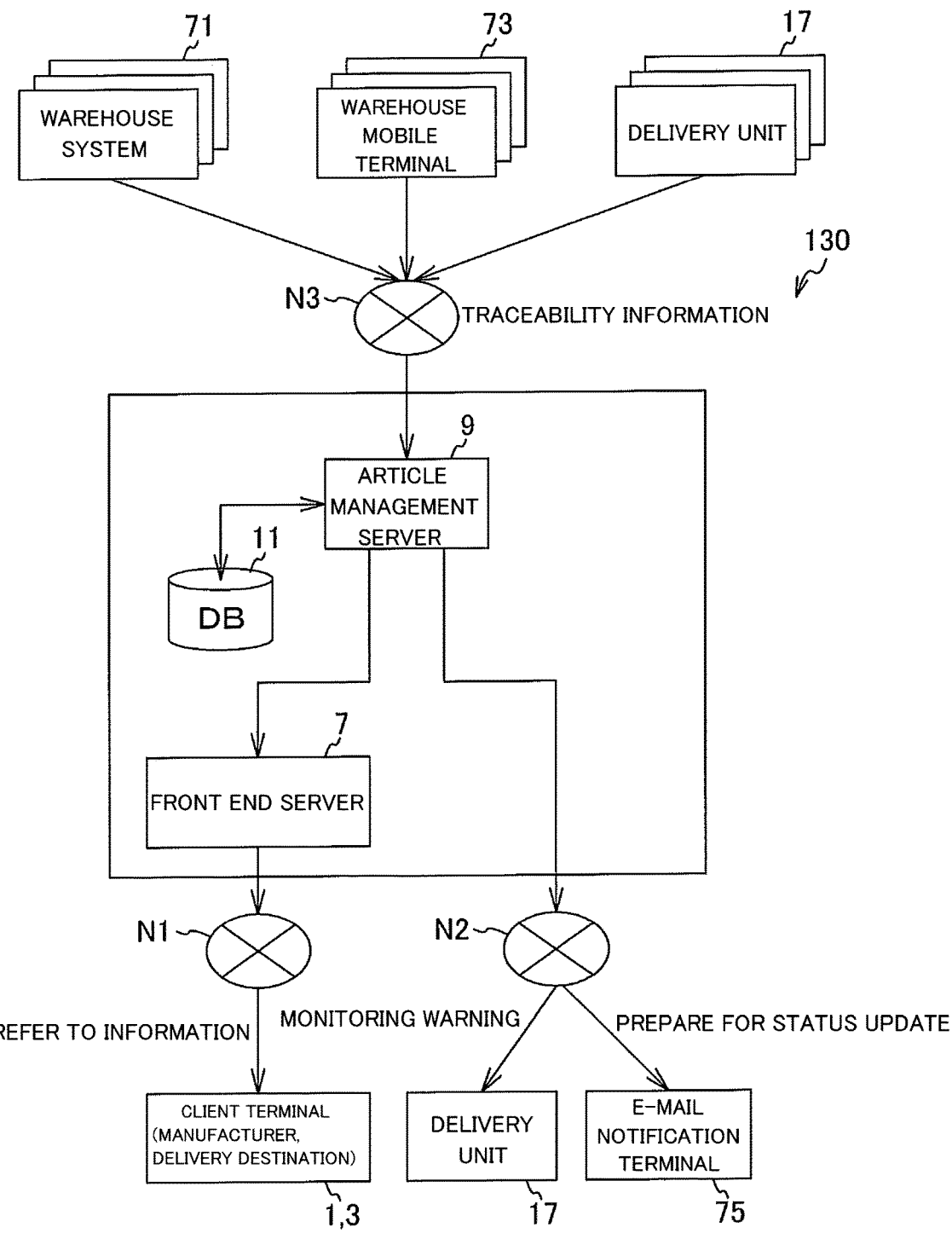
FIG. 16 is a diagram illustrating a system configuration of a notification function according to one embodiment of the present invention.

FIG. 16 is a diagram illustrating a system configuration of a notification function according to one embodiment of the present invention.

A notification functional system 130 includes a warehouse system 71 in a warehouse, a warehouse mobile terminal 73 in the warehouse, the delivery units 17, the communication networks N1, N2, and N3, the article management device 5 (the article management server 9, the database (DB) 11, the front end server 7), the client terminals 1 and, and an e-mail notification terminal 75.

Upon reception of traceability information from the warehouse system 71 in the warehouse, the warehouse mobile terminal 73 in the warehouse, or the delivery unit 17 via the communication network N3, the article management server 9 stores these pieces of information in the database (DB) 11, and processes these pieces of information and transmits the information to the front end server 7.

The front end server 7 transmits information for referring to these pieces of information to the client terminal 1 (manufacturer) and the client terminal 3 (delivery destination) via the communication network N1.

Further, the article management server 9 transmits monitoring warning information to the delivery unit 17 and transmits a notification of status update to the e-mail notification terminal 75 via the communication network N2.

<Monitoring and Alarm Activation Sequence>

Figure 17:
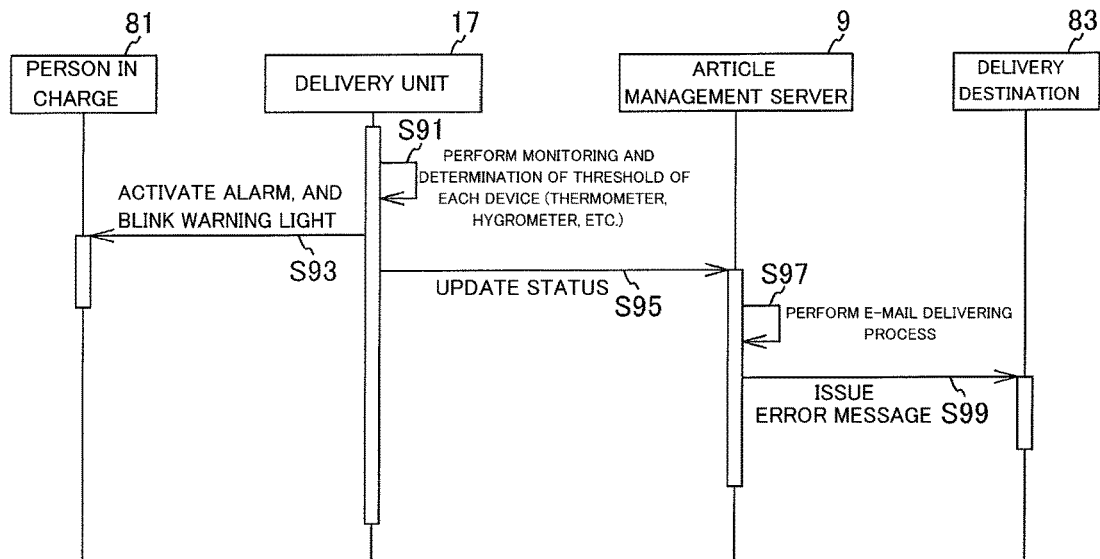
FIG. 17 is a sequence diagram of monitoring and alarm activation according to one embodiment of the present invention.

FIG. 17 is a sequence diagram of monitoring and alarm activation according to one embodiment of the present invention.

At Step S91, in the delivery unit 17, each sensor monitors the state in the storage container 25, to determine whether data of each sensor exceeds a threshold set by the PC 29.

At Step S93, in the PC 29, when the data exceeds the threshold as a result of determination of the data, an alarm device 35 is activated to activate an alarm, and notifies this matter to a person in charge 81 by blinking the warning light.

At Step S95, in the delivery unit 17, the status representing the operation contents is updated and notified to the article management server 9.

At Step S97, the article management server 9 performs an e-mail delivering process to a delivery destination 83.

At Step S99, the article management server 9 sends an error message to the delivery destination 83. Accordingly, the person in charge 81 can recognize the abnormality in the delivery unit 17 immediately, and it can be found which delivery unit has the abnormality at the delivery destination.

<Communication Interrupting Process>

Figure 18:
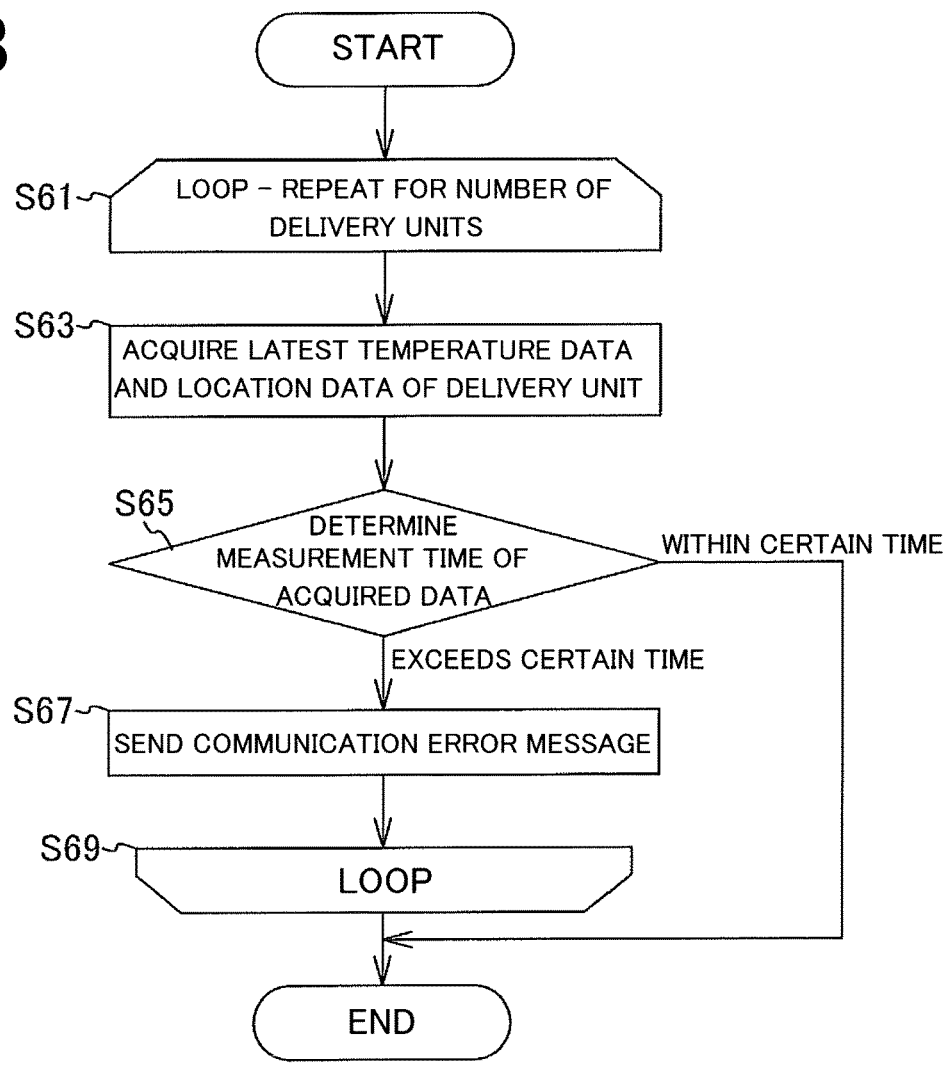
FIG. 18 is a flowchart representing a communication interrupting process between the delivery unit and the article management server according to one embodiment of the present invention.

FIG. 18 is a flowchart representing a communication interrupting process between the delivery unit 17 and the article management server 9 according to one embodiment of the present invention.

At Step S61, the article management server 9 repeats the following process for the number of delivery units 17 as loop processing.

At Step S63, the article management server 9 acquires the latest temperature data and location data of the delivery unit 17.

At Step S65, the article management server 9 determines the measurement time of the acquired data, and when the time from the previous measurement time to the present measurement time exceeds a certain time (for example, one minute), the article management server 9 proceeds to Step S67, and when the time is within the certain time, proceeds to Step S69.

At Step S67, the article management server 9 sends a communication error message to the delivery destination 83. At Step S69, the article management server 9 repeats the process for the number of delivery units 17, and thereafter, ends the loop processing.

<Sequence of Traceability>

Figure 19:
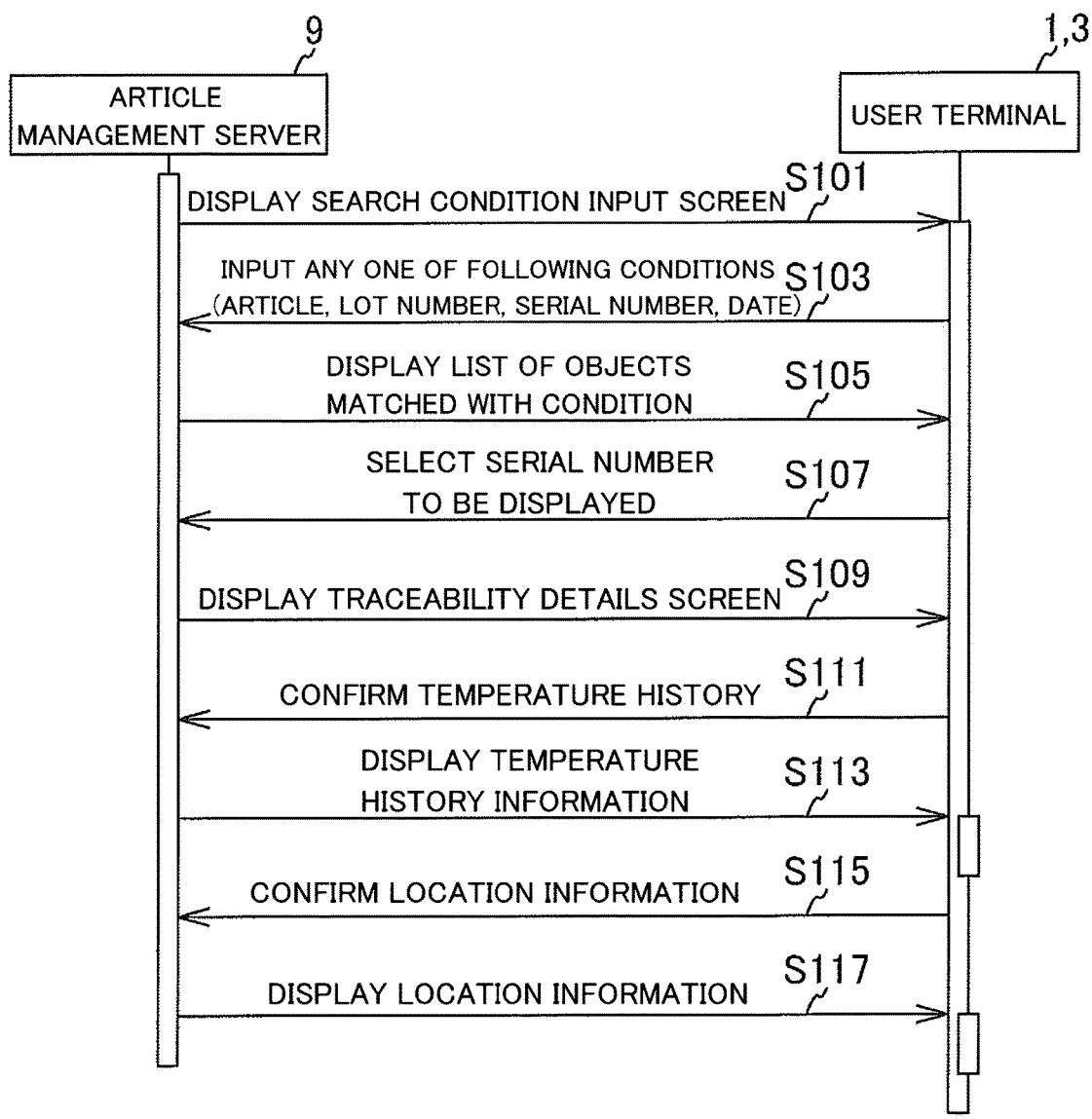
FIG. 19 is a sequence diagram of traceability according to one embodiment of the present invention.

FIG. 19 is a sequence diagram of traceability according to one embodiment of the present invention.

At Step S101, the article management server 9 transmits display data of a search condition input screen illustrated in (1) in FIG. 20(a) to the user terminal 1 or 3.

At Step S103, a user of the user terminal 1 or 3 inputs a condition of any one of a product, a lot number, a serial number of the product, and a date to the search condition input screen displayed on a monitor.

At Step S105, the article management server 9 displays a list of objects matched with the condition ((2) in FIG. 20(a)).

At Step S107, the user selects a serial number of a product to be displayed, which is indicated by a reference numeral 85 on the screen, on the screen illustrated in (2) in FIG. 20(a) displayed on the monitor, and transmits the serial number to the article management server 9.

At Step S109, the article management server 9 uses the serial number received from the user terminal 1 or 3 as a key, to generate transport status data corresponding to the serial number based on the serial temperature history file (F9) memorized in the database DB 11 ((1) in FIG. 20(b)).

Further, the article management server 9 extracts an update date and time (year/month/day), a status, a unit number, a current location, a freight movement source, a freight movement destination, and the like from the serial temperature history file (F9) memorized in the database DB 11, corresponding to the serial number, to generate transport history data ((2) in FIG. 20(b)).

The article management server 9 generates a traceability outline screen including the transport status data and the transport history data described above and transmits the screen data (FIG. 20(b)).

At Step S111, the user of the user terminal 1 or 3 confirms the temperature history based on the screen illustrated in FIG. 20(b).

At Step S113, the article management server 9 transmits screen data for displaying the temperature history information illustrated in FIG. 20 to the user terminal 1 or 3.

At Step S115, the user of the user terminal 1 or 3 confirms the location information based on the traceability details screen illustrated in FIG. 20(b).

Figure 23A:
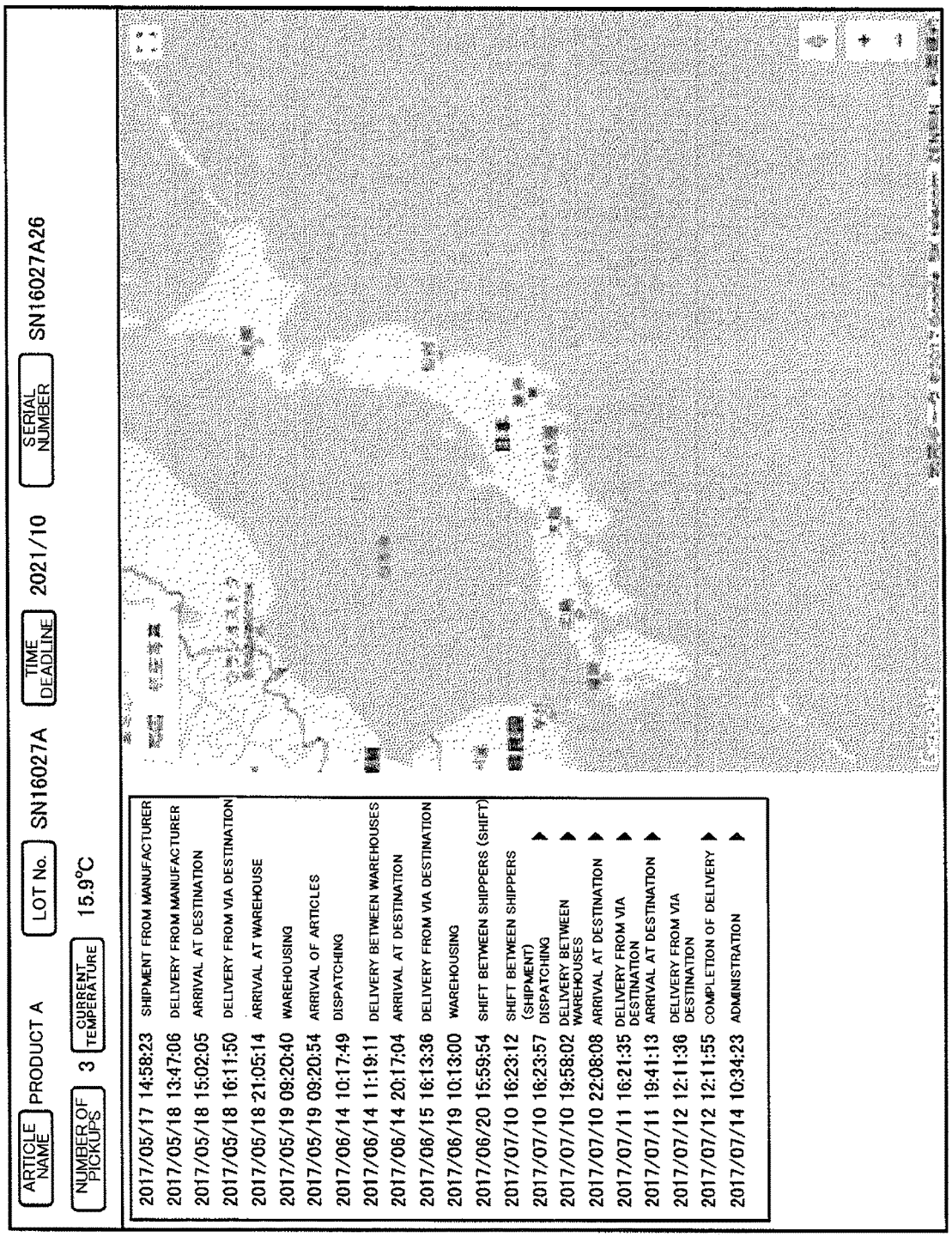
FIGS. 23(a) and (b) are diagrams illustrating a map screen including location information, being an example of transport status data according to one embodiment of the present invention.

At Step S117, the article management server 9 transmits data displaying the location information illustrated in FIGS. 23(a) and (b).

<Screen Transition of Temperature History Information>

FIGS. 20(a) and (b) are screen transition diagrams of temperature history information, being an example of transport status data according to one embodiment of the present invention.

(1) in FIG. 20(a) indicates a search condition input screen, and a user of the user terminal 1 or 3 inputs a condition of any one of a product name, a lot number, a serial number, and a date.

(2) in FIG. 20(a) indicates a list of objects matched with the search condition. The user of the user terminal 1 or 3 selects a serial number to be displayed on the screen. For example, it is assumed that the user has selected a serial number indicated by the reference numeral 85. The trace file F7 corresponding to the selected serial number (for example, SE17005A26) is displayed as the transport status data as illustrated in (1) in FIG. 20(b), and the transport history data illustrated in (2) in FIG. 20(b) is displayed.

(1) and (2) in FIG. 20(b) represent a display screen to be used for confirming the temperature history to be used in a previous stage of displaying the traceability details screen, and when a "CONFIRM TEMPERATURE HISTORY" button B31 is pressed, the temperature history is displayed.

<Temperature History Graph>

Figure 21:
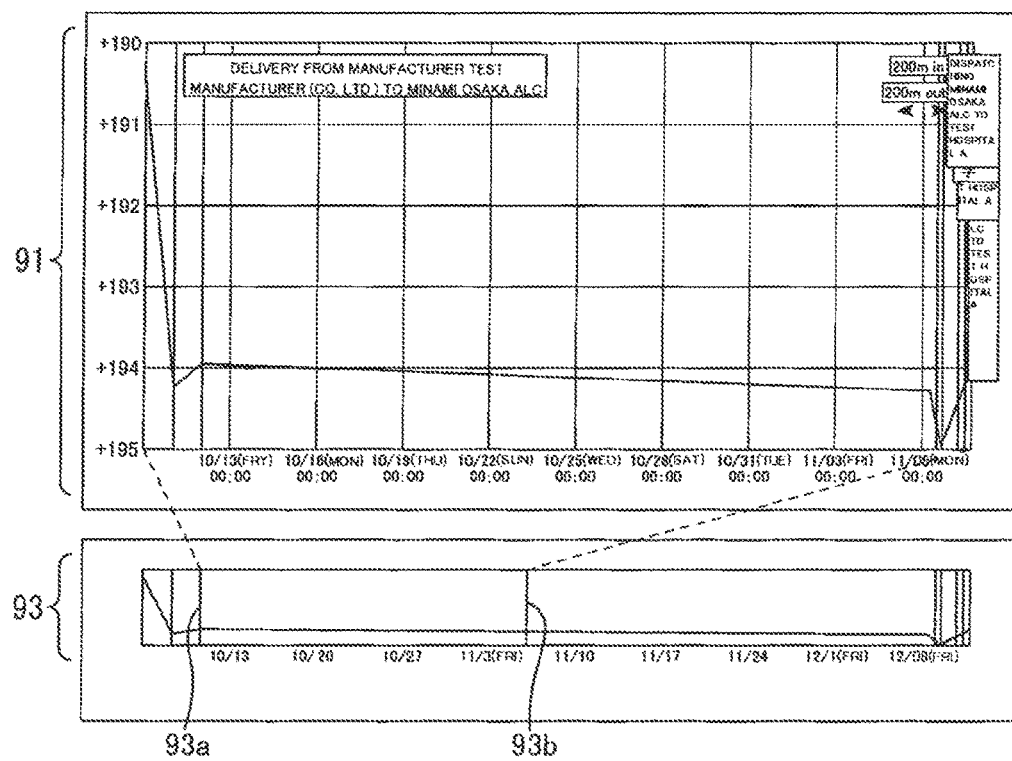
FIG. 21 is a diagram illustrating a temperature history graph displayed on a user terminal, being an example of transport status data according to one embodiment of the present invention.

FIG. 21 is a diagram illustrating a temperature history graph displayed on a user terminal, being an example of transport status data according to one embodiment of the present invention.

A temperature history graph 91 is a graph corresponding to the input a lot number, a temperature history, and a serial number, and represents a temperature value on a vertical axis and a time on a horizontal axis.

A range specifying area 93 indicates a range from a start date and time to an end date and time of data included in the temperature history information corresponding to the lot number and the serial number.

In FIG. 21, by moving a display start timing cursor 93a and a display end timing cursor 93b indicated in the range specifying area 93 by a mouse operation, the display range can be specified to vary a time axis (the horizontal axis) of the graph 91 telescopically, and the display flexibility of the temperature history can be enlarged in the direction of the time axis.

<Transition of Location Information>

FIGS. 22(a) and (b) are screen transition diagrams of location information, being an example of transport status data according to one embodiment of the present invention.

(1) in FIG. 22(a) is a search condition input screen, and a user of the user terminal 1 or 3 inputs a condition of any one of a product, a lot number, a serial number, and a date.

(2) in FIG. 22(a) displays a list of objects matched with the search condition. The user of the user terminal 1 or 3 selects a serial number to be displayed from the screen.

FIG. 22(b) is a diagram for confirming the location information, and when a "CONFIRM LOCATION INFORMATION" button B33 is pressed, the location information is displayed.

<Map Screen Including Location Information>

FIGS. 23(a) and (b) are diagrams illustrating a map screen including location information, being an example of transport status data according to one embodiment of the present invention.

Figure 23B:
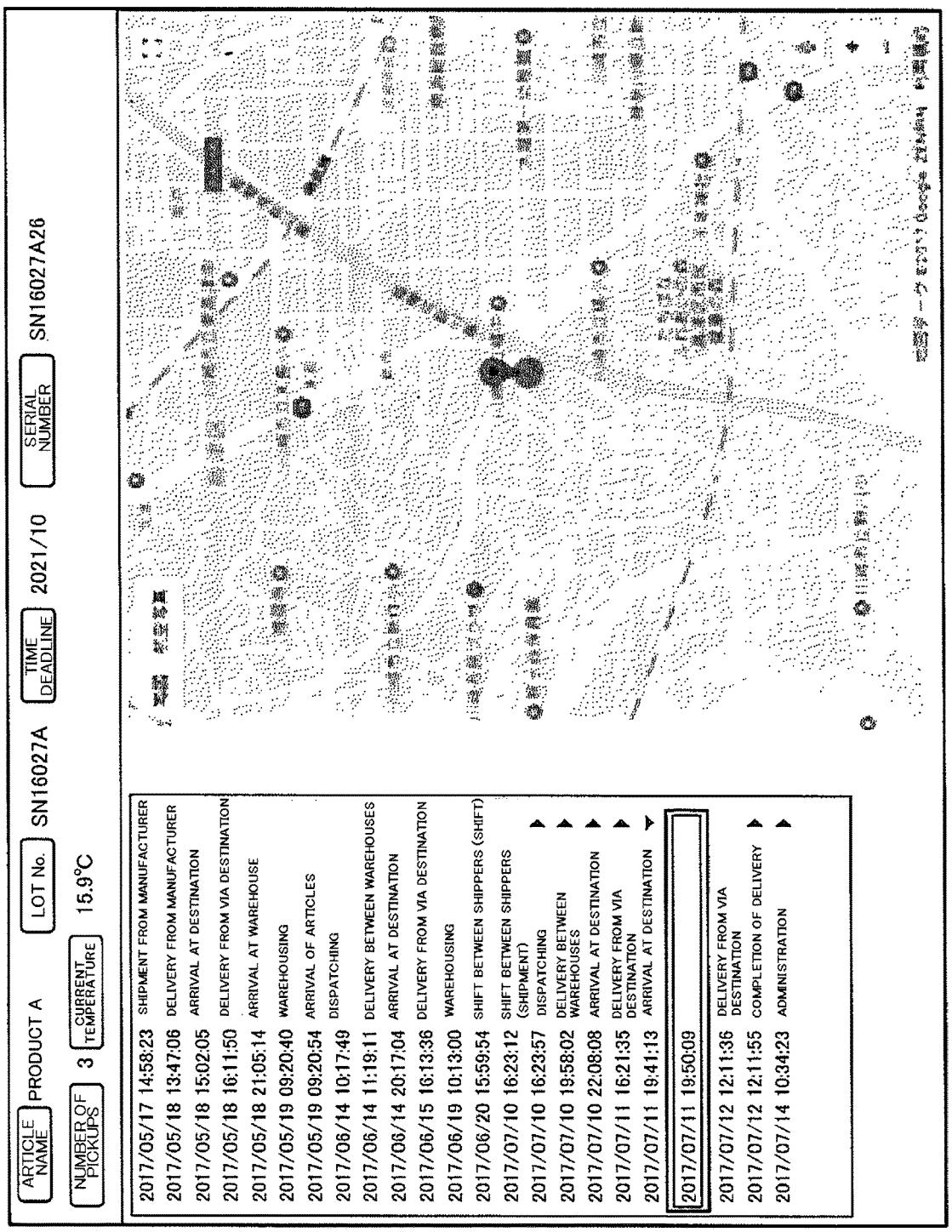

FIG. 23(a) is a diagram indicating the map screen including the location information, and FIG. 23(b) is a detailed diagram of the map screen including the location information.

Traceability in Location Processing>

Figure 24:
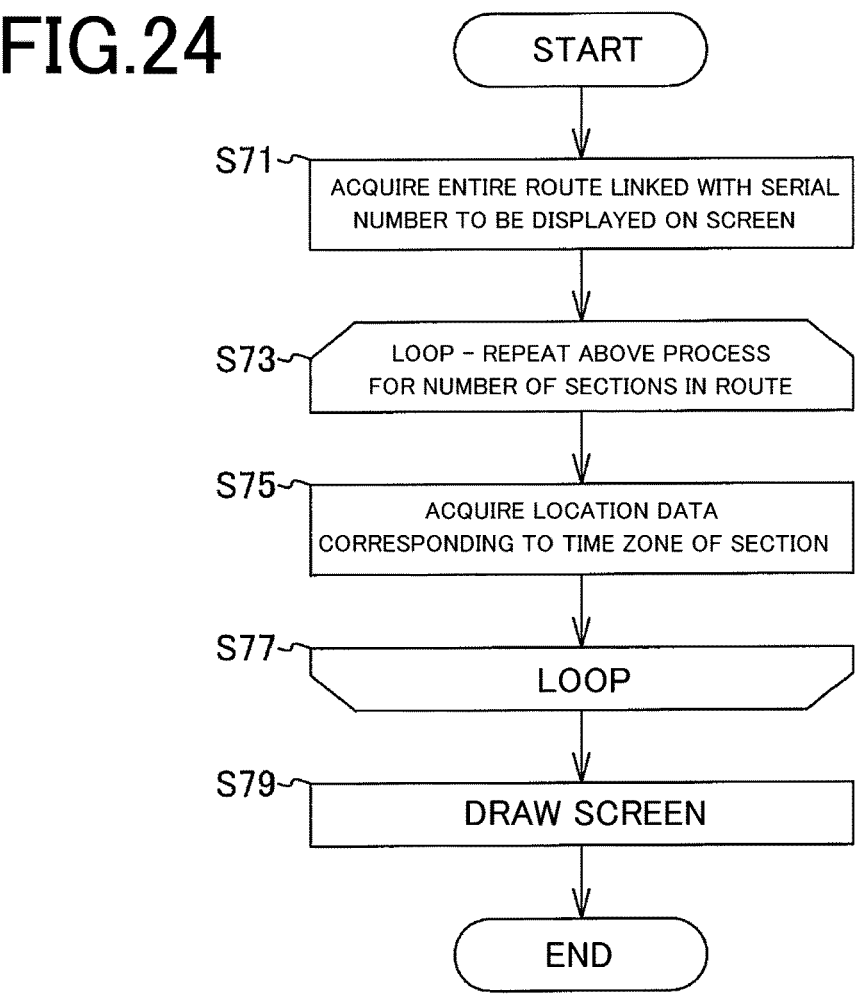
FIG. 24 is a flowchart of traceability in location processing by the article management server according to one embodiment of the present invention.

FIG. 24 is a flowchart of traceability in location processing by the article management server according to one embodiment of the present invention.

At Step S71, the article management server 9 acquires location data of the entire route associated with the serial number to be displayed on the screen. That is, the article management server 9 extracts a unit number and a date and time of a delivery unit 17, which is loaded with an article having the serial number, from the serial temperature history file F9 and extracts location data (latitude and longitude) corresponding to the unit number and the date and time from the GPS information file F1 in the second memory unit 11b.

At Step S73, the article management server 9 repeats the process as loop processing for the number of sections in the route.

At Step S75, the article management server 9 acquires location data corresponding to the time zone of a section.

At Step S77, after repeating the above process for the number of sections in the route, the article management server 9 finishes the loop processing and proceeds to Step S79.

At Step S79, the article management server 9 draws a screen based on the acquired location data (FIG. 23).

<Route Division>

Figure 25:
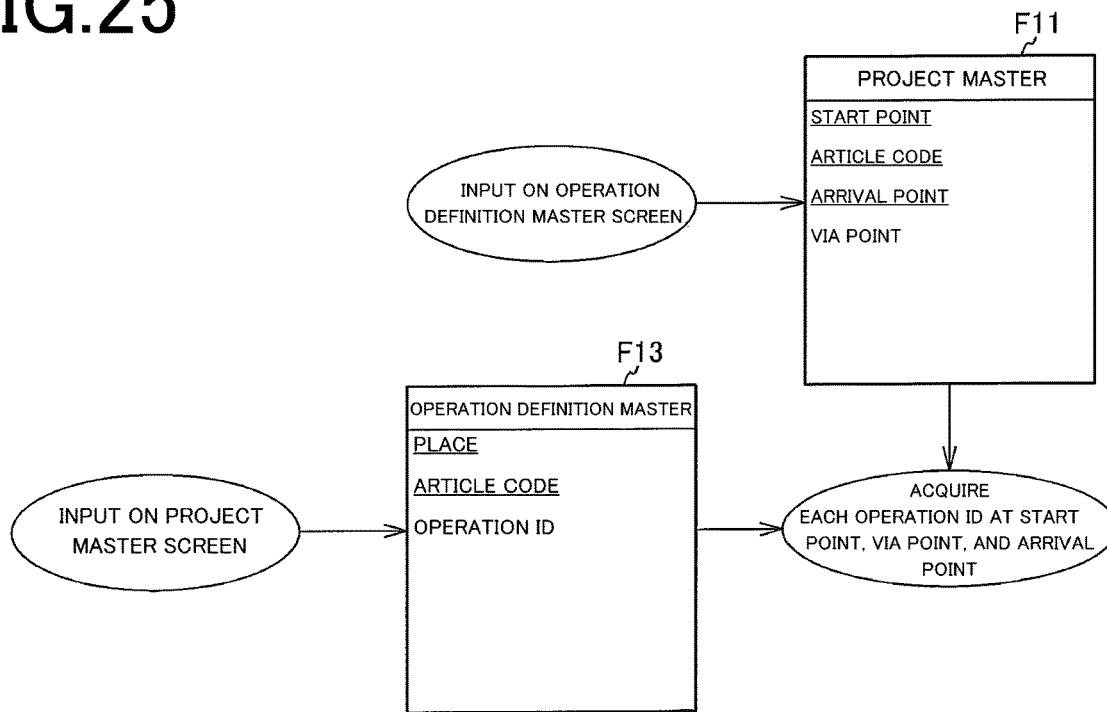
FIG. 25 is an ER diagram of route division according to one embodiment of the present invention.

FIG. 25 is an ER diagram of route division according to one embodiment of the present invention.

The article management server 9 inputs and adds a start point, a product code, an arrival point, and a via point on a project master screen to generate a project master F11.

The article management server 9 inputs and adds a place, a product code, and an operation ID on an operation definition master screen to generate an operation definition master F13.

The article management server 9 uses the start point, the product code, and the arrival point as a key, to extract a via point from the project master F11, and uses the place and the product code as a key to extract an operation ID from the operation definition master F13, thereby acquiring each operation ID at the start point, the via point, and the arrival point.

<Route Division Sequence>

Figure 26:
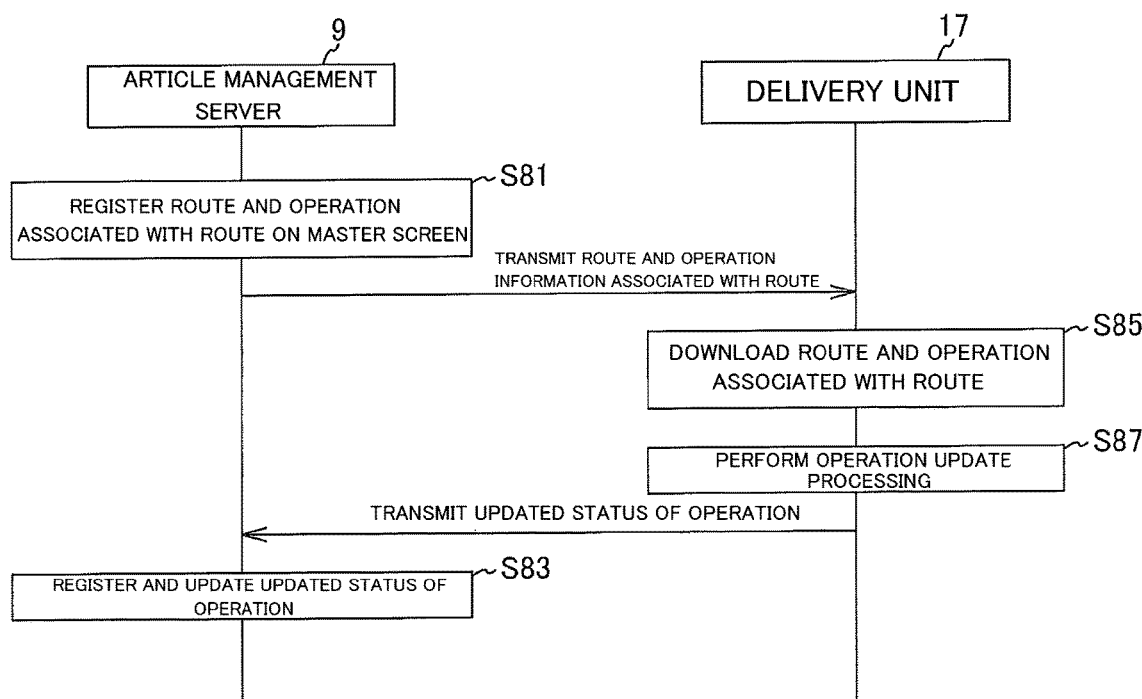
FIG. 26 is a route division sequence diagram according to one embodiment of the present invention.

FIG. 26 is a route division sequence diagram according to one embodiment of the present invention.

At Step S81, the article management server 9 registers a route and operation information associated with the route on a master screen, and transmits the route and the operation information associated with the route to the delivery unit 17.

At Step S85, the delivery unit 17 downloads the route and an operation associated with the route registered by the article management server 9 via the communication network N2.

At Step S87, the delivery unit 17 performs operation update processing based on the downloaded operation information associated with the route, and transmits an updated status of the operation to the article management server 9.

At Step S83, the article management server 9 performs registration and update of the updated status of the operation.

Summary of Actions and Effects of Aspects in the Present Embodiment

<First Aspect>

The delivery management system 100 according to the present aspect is a delivery management system 100 characterized in including the delivery unit 17 for delivering a container in which an accommodated article is cooled by a refrigerant, and the article management server 9 that communicates with the delivery unit 17 during transport via the communication networks N1, N2, and N3. The delivery unit 17 includes the GPS receiver 37 that receives each GPS signal from a plurality of GPS satellites to calculate location data based on each of the GPS signals, adds a unique device code to the location data, and transmits the location data to the article management server 9, the thermometer Se1 that measures the temperature in the storage container 25, the first memory unit 41a that memorizes therein temperature data measured by the thermometer Se1 in a time series, and the wireless router 27 that adds a unit number of the delivery unit 17 to temperature data acquired from the first memory unit 41a and transmits the temperature data to the article management server 9 via the communication network N2 regularly and/or irregularly. The article management server 9 includes the second memory unit 11b that memorizes the location data and the device code received from the GPS receiver 37 in association with each other in the GPS information file F1, the third memory unit 11*c* that memorizes the temperature data received from the delivery unit 17 regularly and/or irregularly associated with each unit number in the temperature history file F5, the fourth memory unit 11*d* that memorizes the unit number and a serial number of the article in association with each other in the trace file F7, and the transport-status-data generation unit 9*a* that generates transport status data representing a serial number, location data, and temperature data of the article during transport, based on location data acquired from the GPS information file F1 in the second memory unit 11*b* corresponding to the device code (step S71 in FIG. 8), temperature data acquired from the temperature history file F5 in the third memory unit 11*c* corresponding to the unit number, and serial number acquired from the trace file F7 (FIG. 9) in the fourth memory unit 11*d* corresponding to the unit number, by using a set of a certain unit number and a device code as a key.

According to the present aspect, the article management server 9 uses a set of a certain unit number and a device code as a key, to generate the transport status data representing the serial number, the location data, and the temperature data of an article during transport, based on the location data acquired corresponding to the device code, the temperature data acquired corresponding to the unit number, and the serial number acquired corresponding to the unit number. Therefore, an environment history acquired from the environment of the container during transport of the article is provided, and the transport status including the transport route and the like of the article can be ascertained, thereby enabling to execute quality control of the article in real time.

Accordingly, the transport status of the article from a delivery destination to a shipment destination becomes clear, and quality control of the articles can be executed more finely in real time.

<Second Aspect>

The delivery unit 17 according to the present aspect is characterized in including at least one of the liquid level indicator Se2 that measures liquid level data of a refrigerant, the vibration indicator Se3 that measures vibration data of vibrations applied from a road surface to the container, the hygrometer Se5 that measures humidity data pertaining to humidity in the storage container 25, and the opening/closing sensor Se4 that counts pieces of opening/closing number data of a lid provided in the container. The first memory unit 41*a* memorizes the temperature data therein by adding at least one of the liquid level data, the vibration data, the humidity data, and the opening/closing number data, and date and time data thereto.

According to the present aspect, by memorizing the temperature data in the delivery unit 17 by adding thereto at least one of the liquid level of the refrigerant, the vibration, the humidity, and the number of opening/closing times, as well as the date and time data in the first memory unit 41*a*, the status inside the delivery unit 17 during transport can be confirmed in a unit of date and time. Therefore, data can be read as required during delivery or after delivery.

<Third Aspect>

The delivery unit 17 according to the present aspect is characterized in including a quality data generation unit that generates quality data of the article, based on at least one of the liquid level data, the vibration data, the humidity data, and the opening/closing number data, in addition to the temperature data and the date and time data acquired from the first memory unit 41*a*, and the printer 31 that creates a quality certificate by printing an image including the serial number and the quality data on a recording medium.

According to the present aspect, print data associated with the quality certificate including a graph image representing the quality along the time series pertaining to the cooling environment in the storage container 25 that accommodates therein an article during delivery is edited based on the serial number and the quality data of the article, and is printed on a recording medium, to create the quality certificate 31*a*, and the quality certificate 31*a* can be issued. Accordingly, at the delivery destination, the quality along the time series pertaining to the cooling environment in the container can be immediately confirmed at site by visually checking the quality certificate 31*a*, upon reception of the container that accommodates therein the article.

<Fourth Aspect>

The delivery unit 17 according to the present aspect is characterized in including the first threshold setting unit 47 that sets a threshold of each of the temperature data, the liquid level data, the vibration data, the humidity data, and the opening/closing number data, and the alarm device 35 that generates a warning sound, when at least one of the temperature data, the liquid level data, the vibration data, the humidity data, and the opening/closing number data has shifted more to a critical value than the threshold set by the first threshold setting unit 47.

According to the present aspect, a threshold can be set in the data of each sensor in the delivery unit 17, and when each threshold reaches a critical value, an alarm can be activated. Therefore, not only a threshold can be set individually corresponding to the type or the degree of importance of the article, but also at the delivery destination or the shipment destination, it can be immediately recognized that the article has reached an abnormal state.

<Fifth Aspect>

The delivery unit 17 according to the present aspect is characterized in, when the alarm device 35 generates a warning sound, transmitting an e-mail including a message that the warning sound has been generated to a terminal of a concerned personnel.

According to the present aspect, since it can be transmitted to the terminal of the concerned personnel that an abnormality has occurred in the article in the delivery unit 17 by an e-mail including a message, the status of the article having an abnormality can be shared with the concerned personnel.

<Sixth Aspect>

The delivery unit 17 according to the present aspect is characterized in, when the alarm device 35 generates a warning sound, transmitting information indicating that the warning sound has been generated to the article management server.

According to the present aspect, since information indicating that an abnormality has occurred in the article in the delivery unit 17 can be transmitted to the article management server, the article management server can collectively control the status of the article having the abnormality.

<Seventh Aspect>

The article management server 9 according to the present aspect is characterized in including the communication error determination unit 9*b* that determines whether received data pertaining to the temperature data and location data received from the delivery unit 17 regularly and/or irregularly has a communication error, and the communication error transmission unit 9*g* that transmits an e-mail including a message indicating that a communication error has occurred to the terminal, when the communication error determination unit 9b has determined that the communicated data has a communication error.

According to the present aspect, when determining that the received data has a communication error, the article management server 9 can transmit an e-mail including the message to the terminal. Therefore, the respective terminals can ascertain the credibility of the received data.

<Eighth Aspect>

The article management server 9 according to the present aspect is characterized in including the first input-screen-data generation unit 9c that generates input screen data for inputting a serial number of the article, and the first delivering unit 7a that delivers input screen data generated by the first input-screen-data generation unit 9 (to the user terminal. The transport-status-data generation unit 9a generates the transport status data by using a serial number received from the user terminal as a key, and the first delivering unit 7a delivers the transport status data generated by the transport-status-data generation unit 9a to the user terminal 3.

According to the present aspect, since the article management server 9 generates the transport status data by using the serial number received from the user terminal as a key, and delivers the transport status data to the user terminal 3, each user terminal 3 can confirm the transport status of each article in real time.

<Ninth Aspect>

The article management server 9 according to the present aspect is characterized in including the transport-route-data generation unit 9d that generates transport route map data by combining a transport route of the article on map data, based on the location data acquired from the second memory unit 11b. The first delivering unit 7a delivers transport route map data generated by the transport-route-data generation unit 9d to the user terminal 3.

According to the present aspect, since the article management server 9 generates the transport route map data by combining the transport route of the article on the map data and delivers the transport route map data to the user terminal 3, a user of the user terminal 3 can confirm a detailed transport route of the article.

<Tenth Aspect>

The article management server 9 according to the present aspect is characterized in including the fifth memory unit 11e that memorizes therein transport status data generated by the transport-status-data generation unit 9a, the second input-screen-data generation unit 9e that generates input screen data by adding an input area for prompting a user to confirm the temperature status of the article, the second delivering unit 7b that delivers input screen data generated by the second input-screen-data generation unit 9e to the user terminal 3, the first reception unit 9j that receives operation data with respect to an input area added to input screen data in the user terminal 3 from the user terminal 3, the temperature-status-data generation unit 9f that generates temperature status data representing the temperature status based on temperature data of an article acquired from the fifth memory unit 11e, by using a serial number as a key, corresponding to operation data received by the first reception unit 9j, and the third delivering unit 7c that delivers temperature status data generated by the temperature-status-data generation unit 9f to the user terminal 3.

According to the present aspect, the article management server 9 generates the input screen data by adding thereto an input area for prompting a user to confirm the temperature status of the article and delivers the input screen data to the user terminal 3. Therefore, on the side of the user terminal 3, the temperature status data representing the temperature status is generated based on the temperature data of the article, corresponding to the received operation data by using the serial number as a key, thereby enabling to execute quality control of the article more specifically.

<Eleventh Aspect>

The user terminal 3 according to the present aspect is characterized in including the first user reception unit 3a that receives the input screen data from the article management server 9, the first user input unit 3b that inputs a serial number of an article to input screen data received by the first user reception unit 3a, the first user transmission unit 3c that transmits a serial number input from the first user input unit 3b to the article management server 9, the second user reception unit 3d that receives transport status data of the article from the article management server 9, and the user display unit 3e that displays transport status data received by the second user reception unit 3d.

According to the present aspect, the user terminal 3 receives the input screen data from the article management server 9, inputs a serial number of the article to received input screen data, transmits the input screen data to the article management server 9, and receives and displays the transport status data of the article. Therefore, a user of the user terminal can confirm the transport status of the article only by inputting the serial number.

<Twelfth Aspect>

The user terminal 3 according to the present aspect is characterized in including the third user reception unit 3f that receives transport route map data from the article management server 9. The user display unit 3e displays thereon transport route map data received by the third user reception unit 3f.

According to the present aspect, since the user terminal 3 can receive the transport route map data from the article management server 9 and display the contents thereof, the user of the user terminal 3 can confirm detailed transport route of the article.

<Thirteenth Aspect>

The user terminal 3 according to the present aspect is characterized in including the fourth user reception unit 3g that receives transport status data added with the latest temperature data of the article from the article management server 9. The user display unit 3e displays thereon transport status data received by the fourth user reception unit 3g.

According to the present aspect, since the user terminal 3 can receive the transport status data added with the latest temperature data of the article from the article management server 9 and display the transport status data, the user of the user terminal 3 can confirm also a temperature change during transport of the article.

<Fourteenth Aspect>

The user terminal 3 according to the present aspect is characterized in including the fifth user reception unit 3h that receives input screen data added with an input area for prompting a user to confirm a temperature status of the article from the article management server 9, the second user input unit 3i that inputs operation data with respect to an input area added to input screen data received by the fifth user reception unit 3h, the second user transmission unit 3j that transmits operation data input by the second user input unit 3i to the article management server 9, and the sixth user reception unit 3k that receives temperature status data representing a temperature status of the article from the article management server 9. The user display unit 3e displays thereon the received temperature status data representing the temperature status of the article.

According to the present aspect, the user terminal 3 receives the input screen data from the article management server 9, inputs to the data the operation data with respect to the input area, and transmits the data to the article management server 9. The user terminal 3 then displays the temperature status data received from the article management server 9. Therefore, the user of the user terminal 3 can instruct regarding the temperature status of the article more specifically.

<Fifteenth Aspect>

The article management server 9 according to the present aspect is characterized in including the route dividing unit 9m that divides an entire route from a start point to an arrival point pertaining to the delivery of the article into sections for each operation of the delivery, the second threshold setting unit 9p that sets a threshold of each of the temperature data, the liquid level data, the vibration data, the humidity data, and the opening/closing number data in the master table 11 with respect to each section divided by the route dividing unit 9m, the threshold acquisition unit 9r that acquires each threshold corresponding to a location from the master table based on location data calculated by the GPS receiver 37, and the second alarm activation unit 9n that generates a warning sound, when at least one of the temperature data, the liquid level data, the vibration data, the humidity data, and the opening/closing state data is more in a critical region than respective thresholds acquired by the threshold acquisition unit 9r.

According to the present aspect, the article management server 9 divides the entire route from the start point to the arrival point into sections for respective operations pertaining to the delivery, and sets a threshold of each of the temperature data, the liquid level data, the vibration data, the humidity data, and the opening/closing number data with respect to each section in the master table 11. Further, the article management server 9 acquires each threshold corresponding to a location from the master table based on the location data calculated by the GPS receiver 37, and issues a warning sound, when any one of the temperature data, the liquid level data, the vibration data, the humidity data, and the opening/closing state data is more in the critical region than the set thresholds. Therefore, the user can immediately judge in which section the article has an abnormality.

<Sixteenth Aspect>

A delivery management method according to the present aspect is a delivery management method executed by the delivery management system including the delivery unit 17 for delivering a container in which an accommodated article is cooled by a refrigerant, and the article management server 9 that communicates with the delivery unit during transport via the communication network N2, characterized in that the delivery unit 17 performs a GPS reception step of receiving each GPS signal from a plurality of GPS satellites to calculate location data based on each of the GPS signals, adding a unique device code to the location data, and transmitting the location data to the article management server 9, a first memory step of memorizing temperature data measured at the temperature measurement step in a time series, a temperature measurement step of measuring the temperature in the container, and a first transmission step of adding a unit number of the delivery unit to temperature data acquired at a memory unit, and transmitting the temperature data to the article management server via the communication network regularly and/or irregularly. The article management server 9 according to the present aspect performs a second memory step of memorizing the location data and the device code received at the GPS reception step in association with each other, a third memory step of memorizing the temperature data received from the delivery unit regularly and/or irregularly in association with the unit number respectively, and a fourth memory step of memorizing the unit number and a serial number of the article in association with each other. The article management server 9 also performs a transport-status-data generation step of generating transport status data representing a serial number, location data, and temperature data of the article during transport, based on location data acquired at the second memory step corresponding to the device code, temperature data acquired at the third memory step corresponding to the unit number, and serial number acquired at the fourth memory step corresponding to the unit number, by using a set of a certain unit number and a device code as a key.

According to the present aspect, the delivery unit 17 that is mounted on the vehicle 21 to accommodate an article in the storage container 25 in which the refrigerant is filled and deliver the storage container, and the article management server 9 that communicates with the delivery unit 17 via the communication networks N1, N2, and N3 are provided. Therefore, an environment history acquired from the environment in the container is provided during transport of an article, and the transport status including the transport route of the article and the like are ascertained, thereby enabling to execute quality control of the article in real time. Accordingly, the transport status of the article from a delivery destination to a shipment destination becomes clear, and quality control of the articles can be executed more finely in real time.

<Seventeenth Aspect>

A program according to the present aspect is characterized in causing a processor to perform respective steps in the delivery management method described in claim 16.

According to the present aspect, a processor can be caused to perform the respective steps. Therefore, the transport status of an article from a delivery destination to a shipment destination becomes clear, and quality control of the articles can be executed more finely in real time.

REFERENCE SIGNS LIST

1 client terminal (manufacturer), 3 client terminal (delivery destination), 5 article management device, 7 front end server, 9 article management server, 17 delivery unit, 19 logistics management server, 21 vehicle, 23 tag, 27 wireless router, 29 PC, 31 printer, 33 battery, 35 alarm device, 37 GPS receiver, 39 bar-code reader, Se1 thermometer, Se2 liquid level indicator, Se3 vibration indicator, Se4 opening/closing sensor, Se5 hygrometer, Se6 voltage detection sensor, Se7 voltage detection sensor, N1 to N3 network

The invention claimed is:

1. A delivery management system comprising a delivery unit for delivering a container in which an accommodated article is cooled by a refrigerant, and an article management server that communicates with the delivery unit during transport via a communication network, wherein the delivery unit includes
a GPS receiver that receives each GPS signal from a plurality of GPS satellites to calculate location data of the delivery unit based on each of the GPS signals, adds a unique device code to the location data, and transmits the location data to the article management server,
a temperature measurement unit that measures a temperature in the container, a first memory unit that memorizes therein temperature data measured by the temperature measurement unit in a time series, and a first transmission unit that adds a unit number of the delivery unit to temperature data acquired from the first memory unit and transmits the temperature data regularly and/or irregularly to the article management server via the communication network, and the article management server includes a second memory unit that memorizes therein the location data and the device code received from the GPS receiver in association with each other, a third memory unit that memorizes therein the temperature data received from the delivery unit regularly and/or irregularly associated with each unit number, a fourth memory unit that memorizes therein the unit number and a serial number of the article in association with each other, and a transport-status-data generation unit that generates transport status data representing a serial number, location data, and temperature data of the article during transport based on location data acquired from the second memory unit corresponding to the device code, temperature data acquired from the third memory unit corresponding to the unit number, and serial number acquired from the fourth memory unit corresponding to the unit number, by using a set of a certain unit number and a device code as a key.

2. The delivery management system according to claim 1, wherein the delivery unit includes at least one of a liquid level detection unit that measures liquid level data pertaining to a liquid level of the refrigerant, a vibration measurement unit that measures vibration data pertaining to vibration applied from a road surface to the container, a humidity measurement unit that measures humidity data pertaining to humidity in the container, and an opening/closing number counting unit that counts pieces of opening/closing number data of a lid provided in the container, and the first memory unit memorizes the temperature data therein by adding at least one of the liquid level data, the vibration data, the humidity data, and the opening/closing number data, and date and time data thereto.

3. The delivery management system according to claim 2, wherein the delivery unit includes a quality data generation unit that generates quality data of the article, based on at least one of the liquid level data, the vibration data, the humidity data, and the opening/closing number data, in addition to the temperature data and the date and time data acquired from the first memory unit, and a printing unit that creates a quality certificate by printing an image including the serial number and the quality data on a recording medium.

4. The delivery management system according to claim 2, wherein the delivery unit includes a first threshold setting unit that sets a threshold of each of the temperature data, the liquid level data, the vibration data, the humidity data, and the opening/closing number data, and a first alarm activation unit that generates a warning sound, when at least one of the temperature data, the liquid level data, the vibration data, the humidity data, and the opening/closing number data has shifted more to a critical value than a threshold set by the first threshold setting unit.

5. The delivery management system according to claim 4, wherein when the first alarm activation unit generates a warning sound, the delivery unit transmits an e-mail including a message that the warning sound has been generated to a terminal of a concerned personnel.

6. The delivery management system according to claim 4, wherein when the first alarm activation unit generates a warning sound, the delivery unit transmits information indicating that the warning sound has been generated to the article management server.

7. The delivery management system according to claim 6, wherein the article management server includes a fifth memory unit that memorizes therein transport status data generated by the transport-status-data generation unit, a second input-screen-data generation unit that generates input screen data by adding an input area for prompting a user to confirm a temperature status of the article, a second delivering unit that delivers input screen data generated by the second input-screen-data generation unit to a user terminal, a first reception unit that receives operation data with respect to an input area added to input screen data in the user terminal from the user terminal, a temperature-status-data generation unit that generates temperature status data representing a temperature status based on temperature data of an article acquired from the fifth memory unit, by using a serial number as a key, corresponding to operation data received by the first reception unit, and a third delivering unit that delivers temperature status data generated by the temperature-status-data generation unit to the user terminal.

8. The delivery management system according to claim 7, wherein the user terminal includes a fifth user reception unit that receives input screen data added with an input area for prompting a user to confirm a temperature status of the article from the article management server, a second user input unit that inputs operation data with respect to an input area added to input screen data received by the fifth user reception unit, a second user transmission unit that transmits operation data input by the second user input unit to the article management server, and a sixth user reception unit that receives temperature status data representing a temperature status of the article from the article management server, and a display unit that displays thereon a received temperature status data representing the temperature status of the article.

9. The delivery management system according to claim 1, wherein the article management server includes a communication error determination unit that determines whether received data pertaining to the temperature data and the location data received from the delivery unit regularly and/or irregularly has a communication error, and a fourth transmission unit that transmits an e-mail including a message indicating that the communication error has occurred to a terminal, when the communication error determination unit has determined that the received data has a communication error.

10. The delivery management system according to claim 9, comprising a user terminal, wherein
the user terminal includes
a first user reception unit that receives input screen data from the article management server,
a first user input unit that inputs a serial number of an article to input screen data received by the first user reception unit,
a first user transmission unit that transmits a serial number input from the first user input unit to the article management server,
a second user reception unit that receives transport status data of the article from the article management server, and
a display unit that displays transport status data received by the second user reception unit.

11. The delivery management system according to claim 10, wherein
the user terminal includes a third user reception unit that receives transport route map data from the article management server, and
the display unit displays thereon transport route map data received by the third user reception unit.

12. The delivery management system according to claim 10, wherein
the user terminal includes a fourth user reception unit that receives transport status data added with latest temperature data of the article from the article management server, and
the display unit displays thereon transport status data received by the fourth user reception unit.

13. The delivery management system according to claim 1, wherein
the article management server includes
a first input-screen-data generation unit that generates input screen data for inputting a serial number of the article, and
a first delivering unit that delivers input screen data generated by the first input-screen-data generation unit to a user terminal,
the transport-status-data generation unit generates the transport status data by using a serial number received from the user terminal as a key, and
the first delivering unit delivers transport status data generated by the transport-status-data generation unit to the user terminal.

14. The delivery management system according to claim 13, wherein
the article management server includes a transport-route-data generation unit that generates transport route map data by combining a transport route of the article on map data, based on location data acquired from the second memory unit, and
the first delivering unit delivers transport route map data generated by the transport-route-data generation unit to the user terminal.

15. The delivery management system according to claim 2, wherein
the article management server includes
a route dividing unit that divides an entire route from a start point to an arrival point pertaining to delivery of the article into sections for each operation of delivery,
a second threshold setting unit that sets a threshold of each of the temperature data, the liquid level data, the vibration data, the liquid level data, the vibration data, the humidity data, and the opening/closing number data in a master table with respect to each section divided by the route dividing unit,
a threshold acquisition unit that acquires each threshold corresponding to the location data from the master table, based on location data acquired from the second memory unit, and
a second alarm activation unit that generates a warning sound, when at least one of the temperature data, the liquid level data, the vibration data, the humidity data, and the opening/closing number data is more in a critical region than respective thresholds acquired by the threshold acquisition unit.

16. A delivery management method executed by a delivery management system including a delivery unit for delivering a container in which an accommodated article is cooled by a refrigerant, and an article management server that communicates with the delivery unit during transport via a communication network, wherein
the delivery unit performs
a GPS reception step of receiving each GPS signal from a plurality of GPS satellites to calculate location data based on each of the GPS signals, adding a unique device code to the location data, and transmitting the location data to the article management server,
a first memory step of memorizing temperature data measured by the temperature measurement step in a time series,
a temperature measurement step of measuring a temperature in the container, and
a first transmission step of adding a unit number of the delivery unit to temperature data acquired at a memory unit and transmitting the temperature data regularly and/or irregularly to the article management server via the communication network, and
the article management server performs
a second memory step of memorizing the location data and the device code received at the GPS reception step in association with each other,
a third memory step of memorizing the temperature data received from the delivery unit regularly and/or irregularly associated with the unit number respectively,
a fourth memory step of memorizing the unit number and a serial number of the article in association with each other, and
a transport-status-data generation step of generating transport status data representing a serial number, location data, and temperature data of the article during transport, based on location data acquired at the second memory step corresponding to the device code, temperature data acquired at the third memory step corresponding to the unit number, and serial number acquired at the fourth memory step corresponding to the unit number, by using a set of a certain unit number and a device code as a key.

17. A program for causing a processor to perform respective steps in the delivery management method according to claim 16.

* * * * *